(12) United States Patent
Choi et al.

(10) Patent No.: US 12,431,051 B2
(45) Date of Patent: Sep. 30, 2025

(54) ELECTRONIC DEVICE HAVING FLEXIBLE DISPLAY

(71) Applicant: Samsung Electronics Co., Ltd., Suwon-si (KR)

(72) Inventors: Yangsoo Choi, Suwon-si (KR); Youngrog Kim, Suwon-si (KR); Taeyang Song, Suwon-si (KR); Changhan Lee, Suwon-si (KR); Donghyun Jo, Suwon-si (KR); Sukdong Kim, Suwon-si (KR); Jihea Park, Suwon-si (KR); Junghyeob Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/816,715

(22) Filed: Aug. 27, 2024

(65) Prior Publication Data

US 2024/0420608 A1  Dec. 19, 2024

Related U.S. Application Data

(63) Continuation of application No. PCT/KR2023/002113, filed on Feb. 14, 2023.

(30) Foreign Application Priority Data

Mar. 28, 2022 (KR) ........................ 10-2022-0037956
Jul. 14, 2022 (KR) ........................ 10-2022-0086700

(51) Int. Cl.
*G06F 3/0482* (2013.01)
*G06F 3/0484* (2022.01)
(Continued)

(52) U.S. Cl.
CPC ........... *G09G 3/035* (2020.08); *G06F 3/0482* (2013.01); *G06F 3/0484* (2013.01); *G06V 30/19* (2022.01);
(Continued)

(58) Field of Classification Search
CPC .................... G06F 1/1652; G06F 2203/04102
See application file for complete search history.

(56) References Cited

U.S. PATENT DOCUMENTS 8,677,284 B2  3/2014  Aguilar
9,413,803 B2  8/2016  Huang et al.
(Continued)

FOREIGN PATENT DOCUMENTS

CN  113687743 A  11/2021
JP  2004086550 A  3/2004
(Continued)

OTHER PUBLICATIONS

International Search Report for PCT/KR2023/002113 mailed May 22, 2023, 4 pages.
(Continued)

*Primary Examiner* — Kevin M Nguyen
(74) *Attorney, Agent, or Firm* — Nixon & Vanderhye P.C.

(57) ABSTRACT

A portable electronic device may include: a first housing; a second housing disposed to be slidable with respect to the first housing; a flexible display in which a display area of the display is contracted or extended on the basis of slide-in or slide-out driving of the second housing; a motor for generating driving force to slide the second housing; a driving circuit for driving the motor; and a processor(s). The processor(s) may: configure the display area of the flexible display as an activation area for displaying visual information; recognize that a consistency problem occurs in an application execution screen when switching from the slide- (Continued)

out state to the slide-in state on the basis of occurrence of a slide-in trigger for contraction of the activation area while displaying the application execution screen on the activation area in the slide-out state; and provide a user interface to allow extension of the activation area on the basis of the occurrence of the consistency problem.

15 Claims, 28 Drawing Sheets

(51) Int. Cl.
    *G06V 30/19*      (2022.01)
    *G09G 3/00*       (2006.01)
(52) U.S. Cl.
    CPC . *G09G 2340/0464* (2013.01); *G09G 2354/00* (2013.01)

(56) References Cited

U.S. PATENT DOCUMENTS

| | | | |
|---|---|---|---|
| 11,132,119 | B2 | 9/2021 | Wild |
| 11,636,824 | B2 | 4/2023 | Kim et al. |
| 2008/0158189 | A1 | 7/2008 | Kim |
| 2012/0281069 | A1 | 11/2012 | Nishio |
| 2013/0275910 | A1 | 10/2013 | Kim et al. |
| 2013/0321260 | A1 | 12/2013 | Joo |
| 2019/0012008 | A1* | 1/2019 | Yoon ................ G06F 1/1652 |
| 2021/0089173 | A1 | 3/2021 | Han et al. |
| 2021/0150953 | A1 | 5/2021 | Lee et al. |
| 2022/0066602 | A1* | 3/2022 | Park ................ G06F 3/04886 |
| 2022/0147116 | A1 | 5/2022 | Lee et al. |
| 2022/0407955 | A1 | 12/2022 | Kim et al. |
| 2023/0017891 | A1 | 1/2023 | Kim et al. |
| 2023/0093986 | A1 | 3/2023 | Eom et al. |
| 2023/0205411 | A1 | 6/2023 | Bian et al. |

FOREIGN PATENT DOCUMENTS

| | | |
|---|---|---|
| JP | 5074233 B2 | 8/2012 |
| JP | 5914884 B2 | 4/2016 |
| JP | 2023539875 A | 9/2023 |
| KR | 100831721 B1 | 5/2008 |
| KR | 20090022037 A | 3/2009 |
| KR | 20120025275 A | 3/2012 |
| KR | 20130136065 A | 12/2013 |
| KR | 101852282 B1 | 6/2018 |
| KR | 102014791 B1 | 10/2019 |
| KR | 20210033784 A | 3/2021 |
| KR | 20210056563 A | 5/2021 |
| KR | 20210060874 A | 5/2021 |
| KR | 20210146095 A | 12/2021 |
| KR | 20220061813 A | 5/2022 |
| WO | 2021100941 A1 | 5/2021 |
| WO | 2021137318 A1 | 7/2021 |
| WO | 2021232961 A1 | 11/2021 |

OTHER PUBLICATIONS

Written Opinion of the ISA for PCT/KR2023/002113 mailed May 22, 2023, 4 pages.

* cited by examiner

ELECTRONIC DEVICE HAVING FLEXIBLE DISPLAY

CROSS-REFERENCE TO RELATED APPLICATIONS

This application is a continuation application of International Application No. PCT/KR2023/002113 filed on Feb. 14, 2023, designating the United States, and claiming priority to Korean Patent Application No. 10-2022-0037956, filed on Mar. 28, 2022, and Korean Patent Application No. 10-2022-0086700, filed on Jul. 14, 2022, in the Korean Intellectual Property Office, the disclosures of which are all hereby incorporated by reference herein in their entireties.

BACKGROUND

Technical Field

Various example embodiments relate to an electronic device having a flexible display and a sliding structure capable of changing an activation area in which visual information is to be displayed.

Description of Related Art

An electronic device may have a sliding structure configured to move and dispose a part of a display from a front surface of the electronic device to an internal space (or a rear surface) of the electronic device. For example, the electronic device may include a slidable housing including a housing and a slider, a roller configured to allow a part of the slider to be retracted into the housing or extended from the housing, and a flexible display.

The sliding structure of the electronic device may be configured such that a part of the display is moved to and disposed in an internal space of the electronic device defined by the slidable housing in a slide-in state in which a part of the slider is retracted into the housing. Alternatively, the sliding structure may be configured such that a part of the display is moved toward and disposed on a rear surface of the electronic device through a side surface of the electronic device in the slide-in state. When the state is switched to a slide-out state in which a part of the slider is extended from the housing, a part of the display, which has been moved toward and disposed on the rear surface, may be moved toward and disposed on a front surface of the electronic device.

The electronic device may display visual information by activating only a part of the display. For example, an activation area, in which visual information is to be displayed, may be practically an entire area of the display in the slide-out state. When the state is switched from the slide-out state to the slide-in state, a part of the display moved to the internal space or moved to the rear surface through the side surface. The remaining part, which excludes the part moved to the internal space (or the rear surface), may be determined as the activation area.

The activation area may be contracted as the slider slides toward the housing, and the activation area may be extended as the slider slides in a direction away from the housing.

SUMMARY

An electronic device may change a layout (or arrangement) of visual information (e.g., an application execution screen) to be displayed in an activation area as a size of the activation area of the display increases or decreases. For example, intervals between user interface (UI) elements (or views), which are components that constitute visual information, may increase as the size of the activation area increases, or the intervals may decrease as the size of the activation area decreases. In case that the intervals between the UI elements are continuously decreased, the UI elements in the screen overlap one another or a part of the UI element is moved to the outside of the screen, which may cause a consistency (or readability) problem that makes it difficult to clearly recognize what the content of the visual information is.

According to various example embodiments, the electronic device may prevent or reduce the occurrence of a consistency problem when a configuration of visual information is changed, thereby allowing a user to clearly recognize the content of the visual information. Technical problems to be solved by the present disclosure are not limited to the above-mentioned technical problems, and other technical problems, which are not mentioned above, may be clearly understood from the following descriptions by those skilled in the art to which the present disclosure pertains.

According to an example embodiment, a portable electronic device may include: a first housing; a second housing disposed to be slidable relative to the first housing; a flexible display in which a display area of the display is configured to be contracted and/or extended on the basis of slide-in and/or slide-out driving of the second housing; a motor configured to generate driving power for sliding the second housing; a driving circuit configured to operate the motor; and at least one processor, comprising processing circuitry, operably connected to the driving circuit and the flexible display. The at least one processor may configure the display area of the flexible display as an activation area in which visual information is displayed. The at least one processor may recognize the occurrence of a slide-in trigger for contracting the activation area while an application execution screen is displayed in the activation area in a slide-out state. The at least one processor may identify whether a consistency problem occurs on the application execution screen when a state is switched from the slide-out state to a slide-in state on the basis of the occurrence of the slide-in trigger. The at least one processor may provide a user interface capable of extending the activation area when the consistency problem occurs.

According to another example embodiment, a portable electronic device may include: a first housing; a second housing disposed to be slidable relative to the first housing; a flexible display in which a display area of the display is contracted or extended on the basis of slide-in or slide-out driving of the second housing; a motor configured to generate driving power for sliding the second housing; a driving circuit configured to operate the motor; and at least one processor operably connected to the driving circuit and the flexible display. The at least one processor may configure the display area of the flexible display as an activation area. The at least one processor may configure a part of the activation area as an app window area in which the application execution screen is displayed. The at least one processor may recognize the occurrence of a slide-in trigger for contracting the activation area while an application execution screen is displayed in the app window area in a slide-out state. The at least one processor may control the driving circuit to contract the activation area and change a layout of the application execution screen on the basis of the occurrence of the slide-in trigger. The at least one processor may recognize that there occurs a consistency problem in which a part of a UI element in the application execution screen with the changed layout is invisible in the app window area designated to display the application execution screen. The at least one processor may remove another area of the activation area and extend the app window area to a position at which another area has been positioned on the basis that the occurrence of the consistency problem is recognized, such that a part of the UI element is visible.

According to still another example embodiment, a portable electronic device may include: a first housing; a second housing disposed to be slidable relative to the first housing; a flexible display in which a display area of the display is contracted or extended on the basis of slide-in or slide-out driving of the second housing; a motor configured to generate driving power for sliding the second housing; a driving circuit configured to operate the motor; and at least one processor operably connected to the driving circuit and the flexible display. The at least one processor may configure a part or the entirety of the activation area as an app window area in which the application execution screen is displayed. The at least one processor may recognize the occurrence of a slide-in trigger for contracting the activation area while an application execution screen is displayed in the app window area in a slide-out state. The at least one processor may control the driving circuit to contract the activation area and change a layout of the application execution screen on the basis of the occurrence of the slide-in trigger. The at least one processor may recognize that there occurs a consistency problem in which a part of a UI element in the application execution screen with the changed layout is invisible in the app window area designated to display the application execution screen. The at least one processor may remove another area, which is configured as a layer higher than the app window area and covers a part of the UI element or increase transparency of another area on the basis that the occurrence of the consistency problem is recognized.

According to yet another example embodiment, a portable electronic device may include: a first housing; a second housing disposed to be slidable relative to the first housing; a flexible display in which a display area of the display is contracted or extended on the basis of slide-in or slide-out driving of the second housing; a motor configured to generate driving power for sliding the second housing; a driving circuit configured to operate the motor; and at least one processor operably connected to the driving circuit and the flexible display. The at least one processor may configure a part or the entirety of the activation area as an app window area in which the application execution screen is displayed. The at least one processor may recognize the occurrence of a slide-in trigger for contracting the activation area while an application execution screen is displayed in the app window area in a slide-out state. The at least one processor may identify that there occurs a consistency problem on the application execution screen when a layout of the application execution screen is changed to a first layout to fit a size of the activation area contracted in response to the slide-in trigger. The at least one processor may change the layout of the application execution screen to a second layout having no consistency problem. The at least one processor may decrease a size application execution screen changed to the second layout to fit a size of the contracted activation area and display the application execution screen in the contracted activation area.

Various example embodiments may provide the electronic device configured to prevent or reduce the occurrence of a consistency problem in the activation area when a configuration of visual information is changed. In addition, various effects that can be directly or indirectly identified through the present document may be provided.

DETAILED DESCRIPTION

Figure 1:
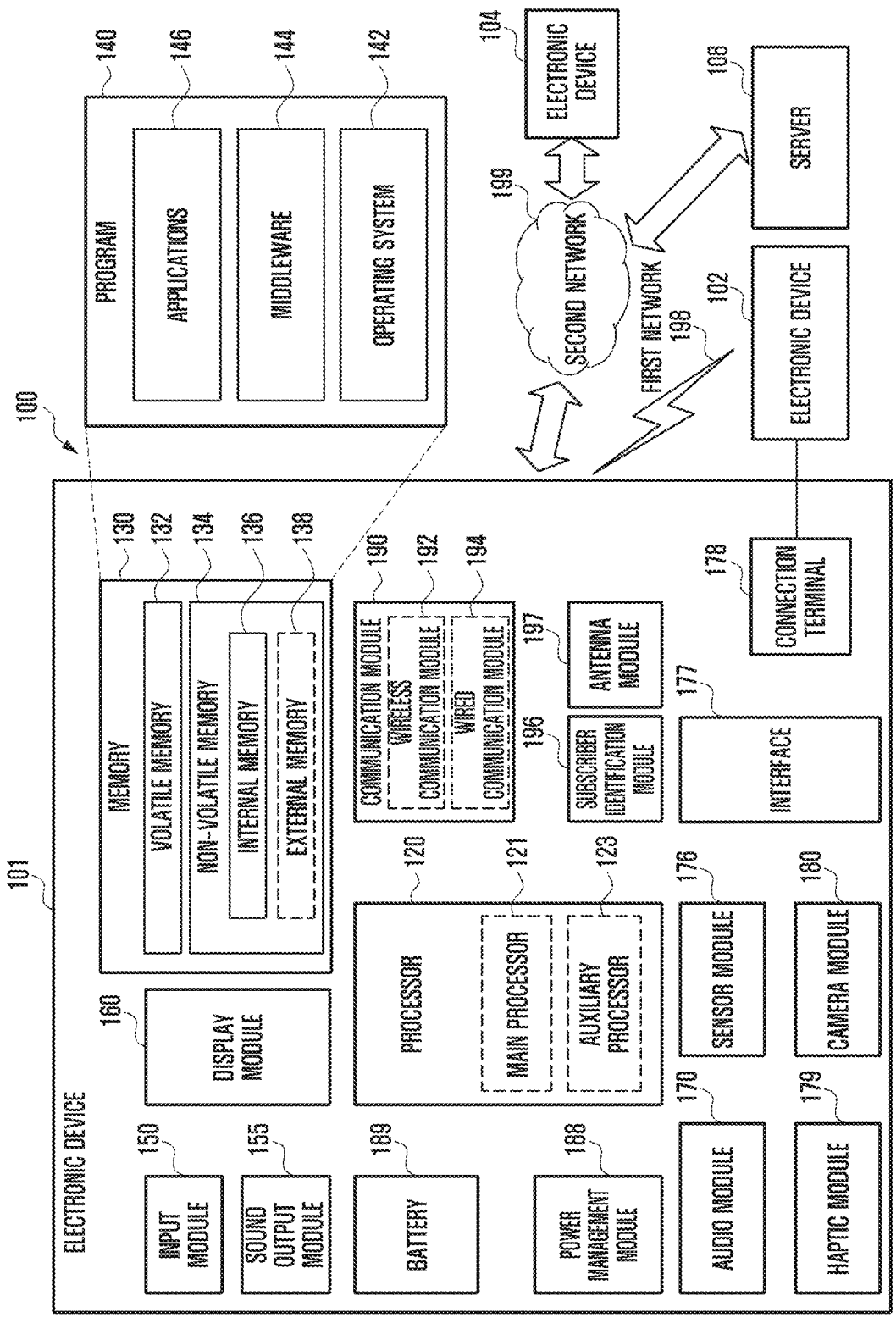
FIG. 1 is a block diagram of an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108.

According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, for convenience of description, a surface of a display, which is visually exposed to a user, may be referred to as a front surface of an electronic device 101. Further, a surface opposite to the front surface may be referred to as a rear surface of the electronic device 101. In addition, a surface, which surrounds a space between the front surface and the rear surface, may be referred to as a side surface of the electronic device 101. The term "state" may refer to a structural form, posture, appearance, or shape of the electronic device 101 (or a display, a slider, or a housing that constitutes the electronic device 101).

Various sliding structures may be applied to the electronic device 101. According to an example embodiment, the electronic device 101 may include a slidable housing including a housing (or a first housing) and a slider (or a second housing), a roller configured to allow the slider to be retracted into the housing or extended from the housing, and a flexible display. The slider may be divided into a portion (hereinafter, referred to as a 'retractable portion') that may enter the inside of the housing, and a portion kept in a state of being exposed to the outside. In a slide-out state (e.g., a first state, an open state, an extended state, or a roll-out state) in which the entire retractable portion of the slider is extended from the housing, the entire display (or the most part of the display area) may be exposed to the outside through the front surface. When the retractable portion of the slider is retracted into the housing, the display may also be retracted into the housing. The display may also be divided into a portion (e.g., a first display area or a first section) kept in a state of being exposed to the outside, and a portion (e.g., a second display area, a second section, or a bendable section) that may enter the inside of the housing. In case that the state is switched to a slide-in state (e.g., a second state, a closed state, a reduced state, or a roll-in state) in which the entire retractable portion of the slider is retracted into the housing, the entire second display area of the display may be retracted into the housing. As another example, when the state is switched from the slide-out state to the slide-in state, a part of the display (e.g., the second display area) may be moved toward and disposed on the rear surface through the side surface without being retracted into the housing. As exemplarily described above, the electronic device 101 may have a sliding structure in which a part of the display is retracted into the housing or a sliding structure in which a part of the display is moved and disposed from the front surface to the rear surface. Only a portion of the display, which is exposed through the front surface, may be determined as an activation area in which visual information is to be displayed. A portion, which is retracted into the housing or moved toward and disposed on the rear surface, may be determined as a deactivation area.

The electronic device 101 may have a sliding structure different in type from that exemplarily described above. According to an example embodiment, the electronic device 101 may include the housing, the roller disposed in the housing, and the flexible (or rollable) display configured to be retracted into the housing by being wound around the roller or extended to the outside of the housing by being unwound from the roller. Even though the display is wound around the roller, a part of the display (e.g., the first display area) may be kept in a state of being exposed to the outside. According to an example embodiment, the entire display area may be retracted into the housing.

Figure 2A:
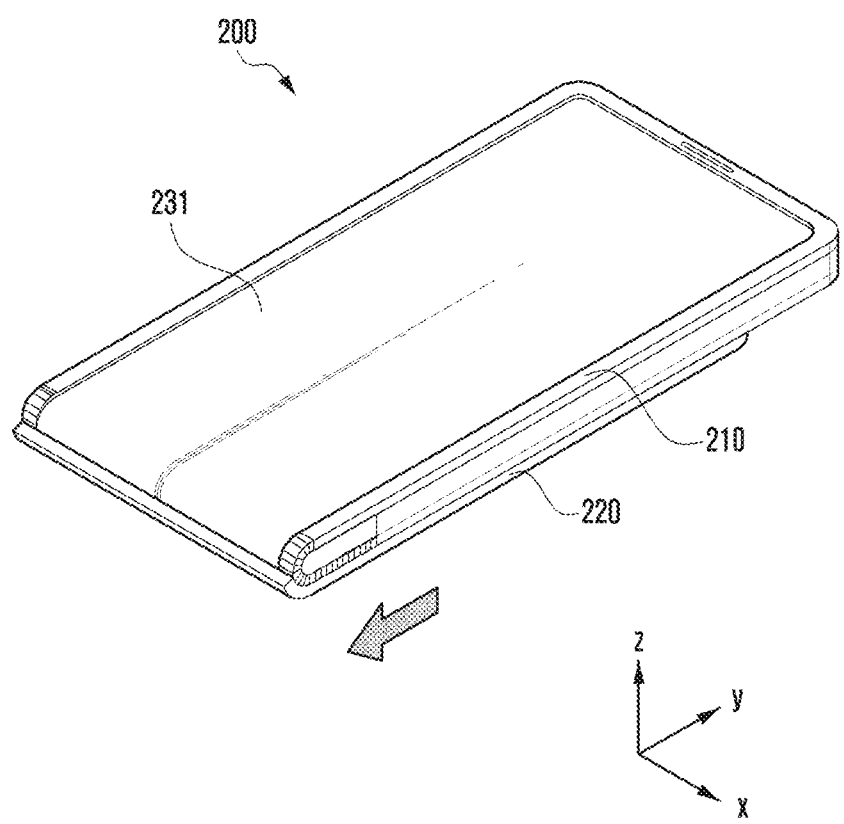
FIGS. 2A and 2B illustrate a portable electronic device having a sliding structure according to an example embodiment.
Figure 2B:
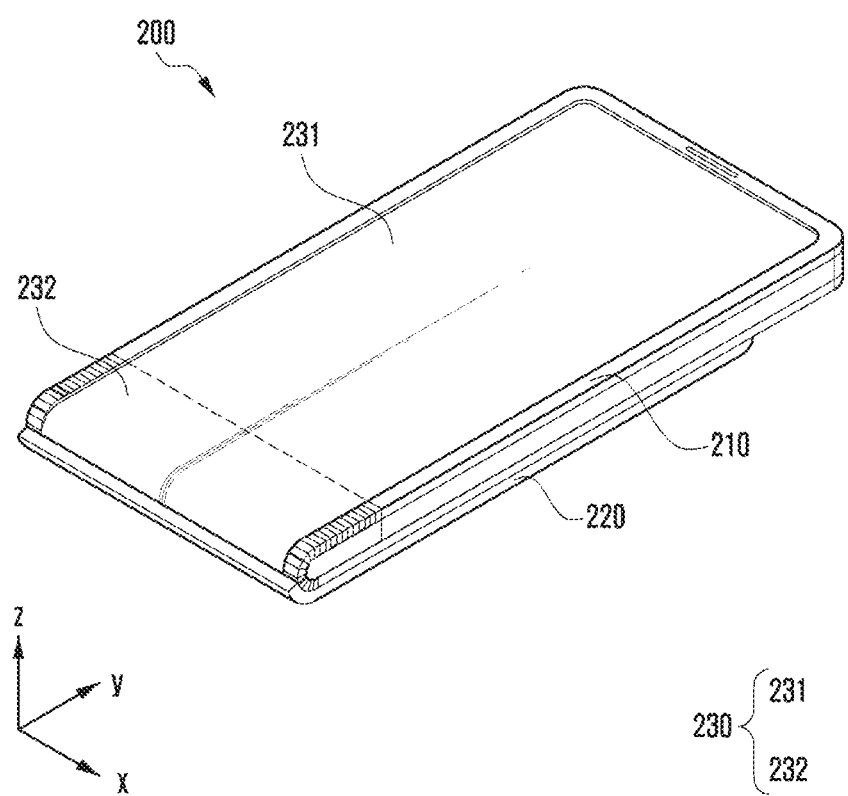

FIGS. 2A and 2B illustrate a portable electronic device 200 having a sliding structure according to an example embodiment. With reference to FIGS. 2A and 2B, the portable electronic device 200 (e.g., the electronic device 101 in FIG. 1) may include a housing (or a first housing) 210, a slider (or a second housing) 220 disposed to be slidable relative to the first housing 210, a flexible display 230 having a display area that is contracted or extended on the basis of slide-in or slide-out driving of the slider 220, a motor disposed in an internal space of the portable electronic device 200 and configured to generate driving power for operating the slider 220, and a driving circuit disposed in the internal space of the portable electronic device 200 and configured to operate the motor.

The slider 220 may be slidably coupled to the housing 210. The motor may be disposed in an internal space of the slider 220. The roller, which is rotated by the driving power of the motor, may be disposed in the internal space of the slider 220. The roller does not need to necessarily roll (rotate), and the roller may serve to mechanically guide the display when the display is wound or unwound. The display 230 may include a first display area 231 disposed adjacent to the housing 210 and visually exposed through the front surface of the electronic device 200, and a second display area 232 configured to be retractable into the internal space. The second display area 232 may enter the inside of the slider 220 and be wound around the roller when the slider 220 slides toward the housing 210. The second display area 232 may be unwound from the roller and visually exposed through the front surface of the electronic device 200 when the slider 220 slides in a direction (e.g., a -y-axis direction illustrated in FIG. 2A) away from the housing 210.

According to an example embodiment, the state of the electronic device 200 may be defined on the basis of a rotation angle of the roller (e.g., an angle at which the roller is rotated in a direction (e.g., clockwise) in which the display 230 is unwound from the roller). For example, in case that the rotation angle of the roller is larger than a first threshold value, a state of the electronic device 200 may be defined as the slide-in state in which only the first display area 231 of the display 230 is exposed (or the second display area 232 is disposed in the internal space). In case that the rotation angle of the roller is larger than a second threshold value larger than the first threshold value, a state of the electronic device 200 may be defined as the slide-out state in which the entire display 230 (e.g., the first display area 231 and the second display area 232) is exposed. The second display area 232 may be kept in a partial slide-in state (e.g., a third state, a partial slide-out state, or an intermediate state) in which the second display area 232 is partially exposed (or partially hidden).

According to an example embodiment, the state of the electronic device 200 may also be defined on the basis of a curvature (a degree of bending) of a designated portion of the display 230. For example, in case that the curvature of the second display area 232 corresponds to a value (or is within a range) that indicates concaveness (or convexness), the state of the electronic device 200 may be defined as the slide-in state. In case that the curvature of the second display area 232 corresponds to a value (or is within a range) that indicates flatness, the state of the electronic device 200 may be defined as the slide-out state.

The activation area of the display 230, in which visual information (e.g., a navigation bar, a status bar, or an application execution screen) is to be displayed, may be determined on the basis of the state of the electronic device 200. For example, in case that the electronic device 200 is in the slide-in state, the activation area may be determined as the first display area 231, such that visual information may be displayed in the first display area 231. In case that the electronic device 200 is in the slide-out state, the activation area may be determined as the entire area (e.g., the first display area 231 and the second display area 232) of the display 230, such that visual information may be displayed in the entire area.

Figure 3A:
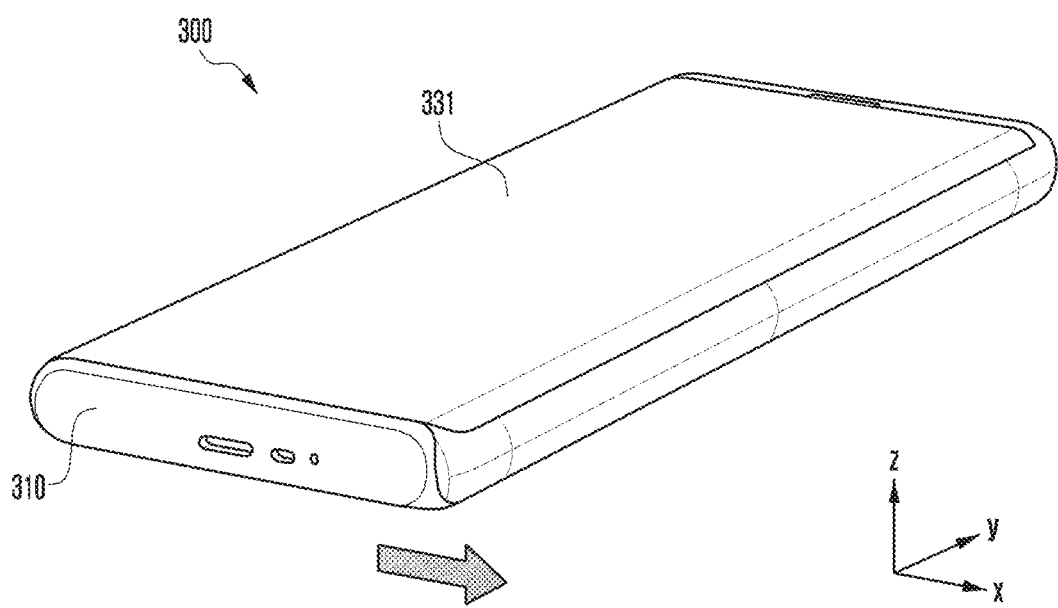
FIGS. 3A and 3B illustrate the portable electronic device having the sliding structure according to an example embodiment.
Figure 3B:
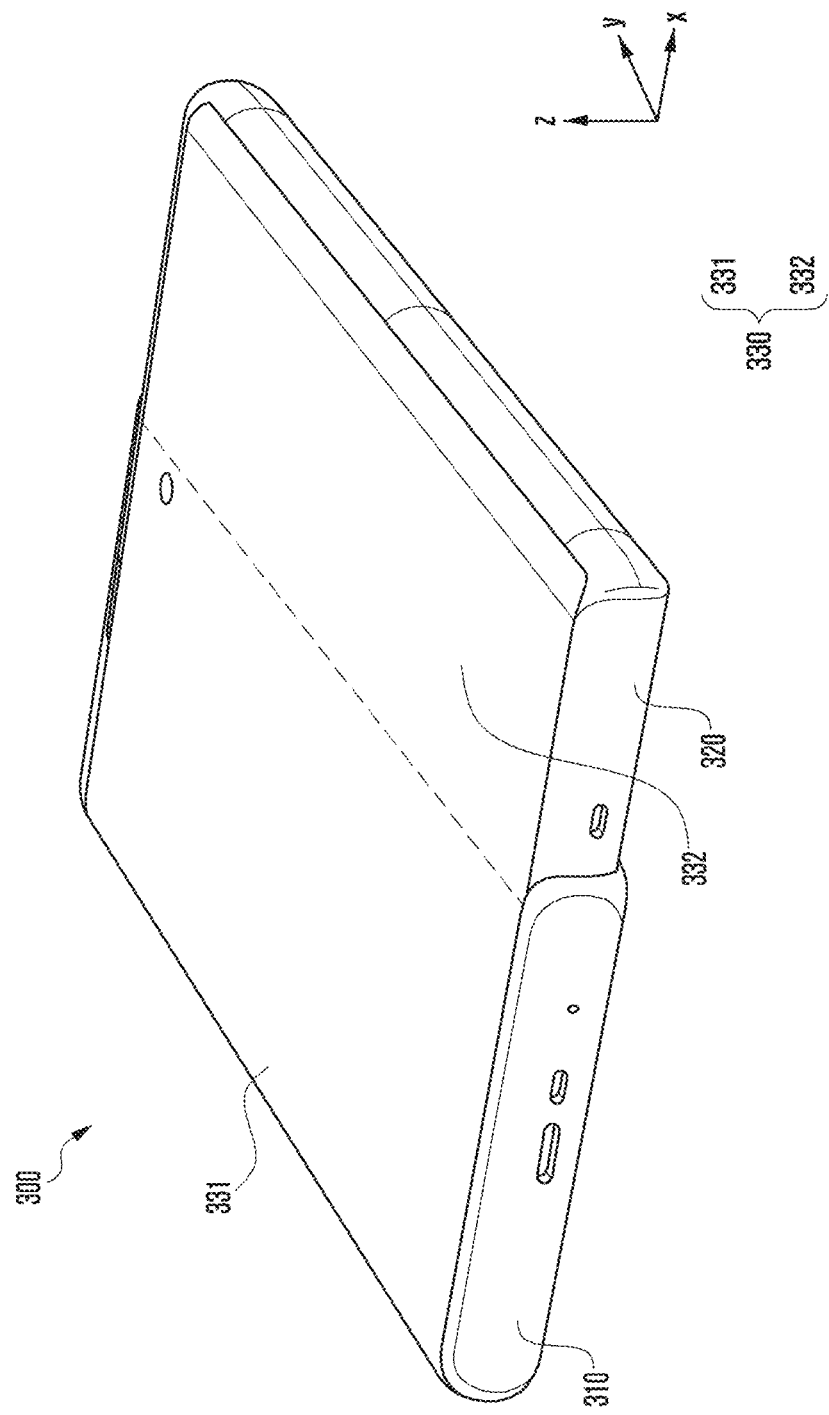

FIGS. 3A and 3B illustrate a portable electronic device 300 having a sliding structure according to an example embodiment. In the description of the portable electronic device 300, the description of the configuration, function, and/or structure duplicated in FIG. 2 will be briefly described or omitted. With reference to FIGS. 3A and 3B, the portable electronic device 300 (e.g., the electronic device 101 in FIG. 1) may include a housing 310, a slider 320, and a flexible display 330 disposed in a space defined by the slidable housings 310 and 320. The display 330 may include a first display area 331 disposed adjacent to the housing 310 and visually exposed through the front surface of the electronic device 300, and a second display area 332 disposed in the internal space. The second display area 332 may be visually exposed through the front surface of the electronic device 200 as the slider 320 slides in a direction (e.g., an x-axis direction illustrated in FIG. 3A) away from the housing 310.

Figure 4A:
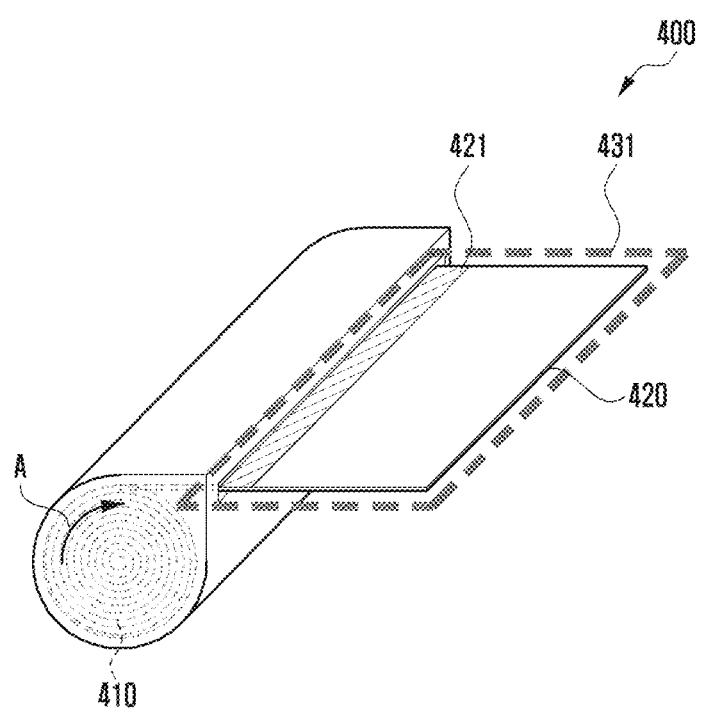
FIGS. 4A, 4B, and 4C illustrate the portable electronic device having the sliding structure according to an example embodiment.
Figure 4B:
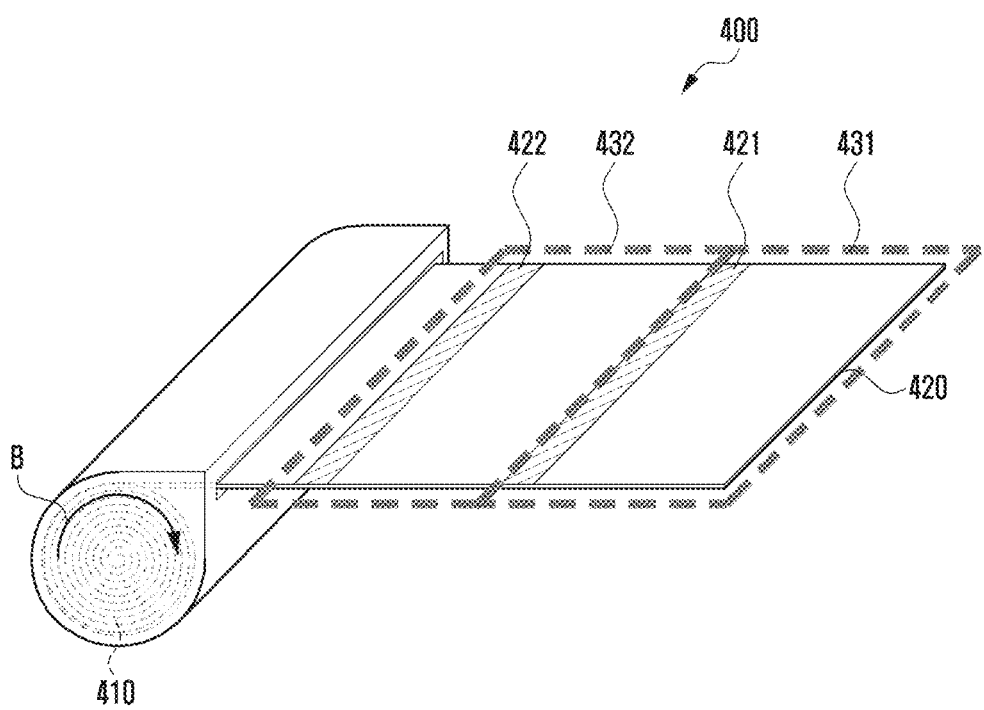
Figure 4C:
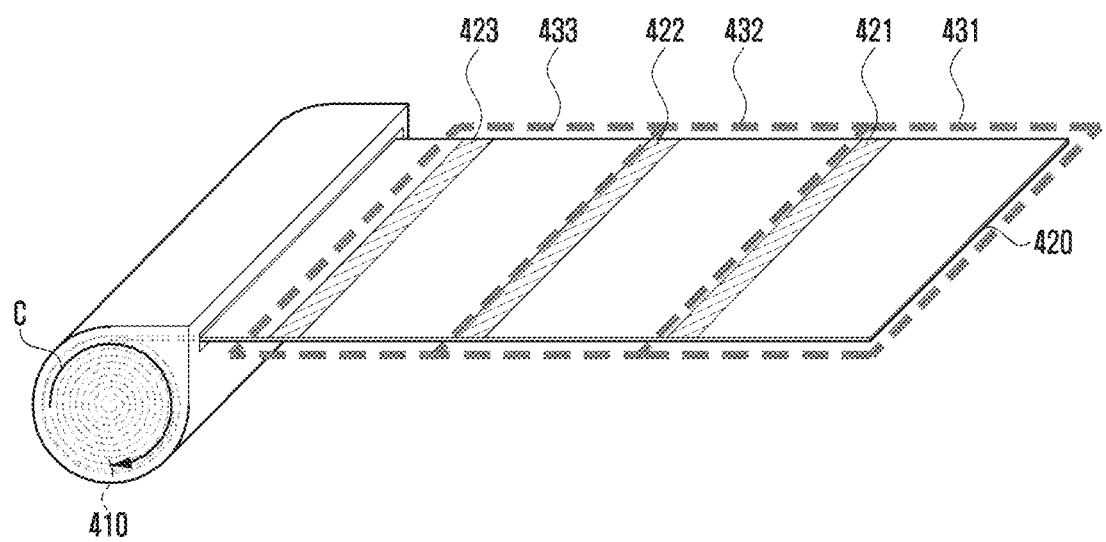

FIGS. 4A, 4B, and 4C illustrate a portable electronic device 400 having a sliding structure according to an example embodiment. With reference to FIGS. 4A, 4B, and 4C, the portable electronic device 400 (e.g., the electronic device 101 in FIG. 1) may include a housing 410, a roller (not illustrated) disposed in the housing 410, and a flexible (or rollable) display 420. The display 420 may be exposed to the outside of the housing 410 by being unwound from the roller or enter the inside of the housing 410 by being wound around the roller.

According to an example embodiment, the state of the electronic device 400 may be defined on the basis of a rotation angle of the roller in the housing 410 (e.g., an angle at which the roller is rotated in a direction (e.g., clockwise) in which the display 420 is unwound from the roller). For example, in case that a rotation angle A of the roller in the housing 410 is larger than the first threshold value, the state of the electronic device 400 may be defined as a first partially unwound state (e.g., the reduced state or the slide-in state) that indicates that the display 420 is partially unwound. In case that a rotation angle B of the roller is larger than the second threshold value larger than the first threshold value, the state of the electronic device 400 may be defined as a second partially unwound state (e.g., a partially extended state or a partial slide-out state) that indicates that the display 420 is further unwound than the display 420 in the first partially unwound state. In case that a rotation angle C of the roller is larger than a third threshold value larger than the second threshold value, the state of the electronic device 400 may be defined as an entirely unwound state (e.g., the extended state or the slide-out state) that indicates that the display 420 is further unwound (or the entire display 420 is unwound) than the display 420 in the second partially unwound state.

According to an example embodiment, the state of the electronic device 400 may also be defined on the basis of a curvature (a degree of bending) of a designated portion of the display 420. For example, in the display 420, a first portion 421, a second portion 422, and a third portion 423 may be designated to determine the state. As illustrated, portions parallel to a rotation axis of the display 420 may be configured as the portions 421, 422, and 423. In case that a curvature of the first portion 421 corresponds to a value (or is within a range) indicating flatness and the curvatures of the other portions 422 and 423 correspond to values (or are within ranges) indicating concaveness (or convexness), the state of the electronic device 400 may be defined as the first partially unwound state. In case that the curvatures of the first and second portions 421 and 422 correspond to values (or are within ranges) indicating flatness and the curvature of the third portion 423 corresponds to a value (or is within a range) indicating concaveness (or convexness), the state of the electronic device 400 may be defined as the second partially unwound state. In case that all the curvatures of the designated portions 421, 422, and 423 correspond to values (or are within ranges) indicating flatness, the state of the electronic device 400 may be defined as the entirely unwound state.

The activation area of the display 420 may be determined on the basis of the state of the electronic device 400. For example, in case that the state of the electronic device 400 is determined as the first partially unwound state, the activation area may be determined as a first display area 431. In case that the state of the electronic device 400 is determined as the second partially unwound state, the activation area may be determined as the first display area 431 and a second display area 432 extending from the first display area 431. In case that the state of the electronic device 400 is determined as the entirely unwound state, the activation area may be determined as the first display area 431, the second display area 432, and a third display area 433 extending from the second display area 432 (e.g., the entire display 420).

In addition to the above-mentioned methods, the state of the electronic device 200 may be defined by identifying a size of the activation area of the display, which is exposed to the front surface portion, via a state detection sensor. In this case, the state detection sensor means a sensor capable of detecting at least one of a change in light amount sensing value, a change in capacitance sensing value, a change in magnetic force or magnetic flux sensing value, a change in resistance sensing value, a change in pressure sensing value, and a change in rotation angle sensing value in accordance with a sliding motion of the slider. A representative sensor will be described below.

Figure 5:
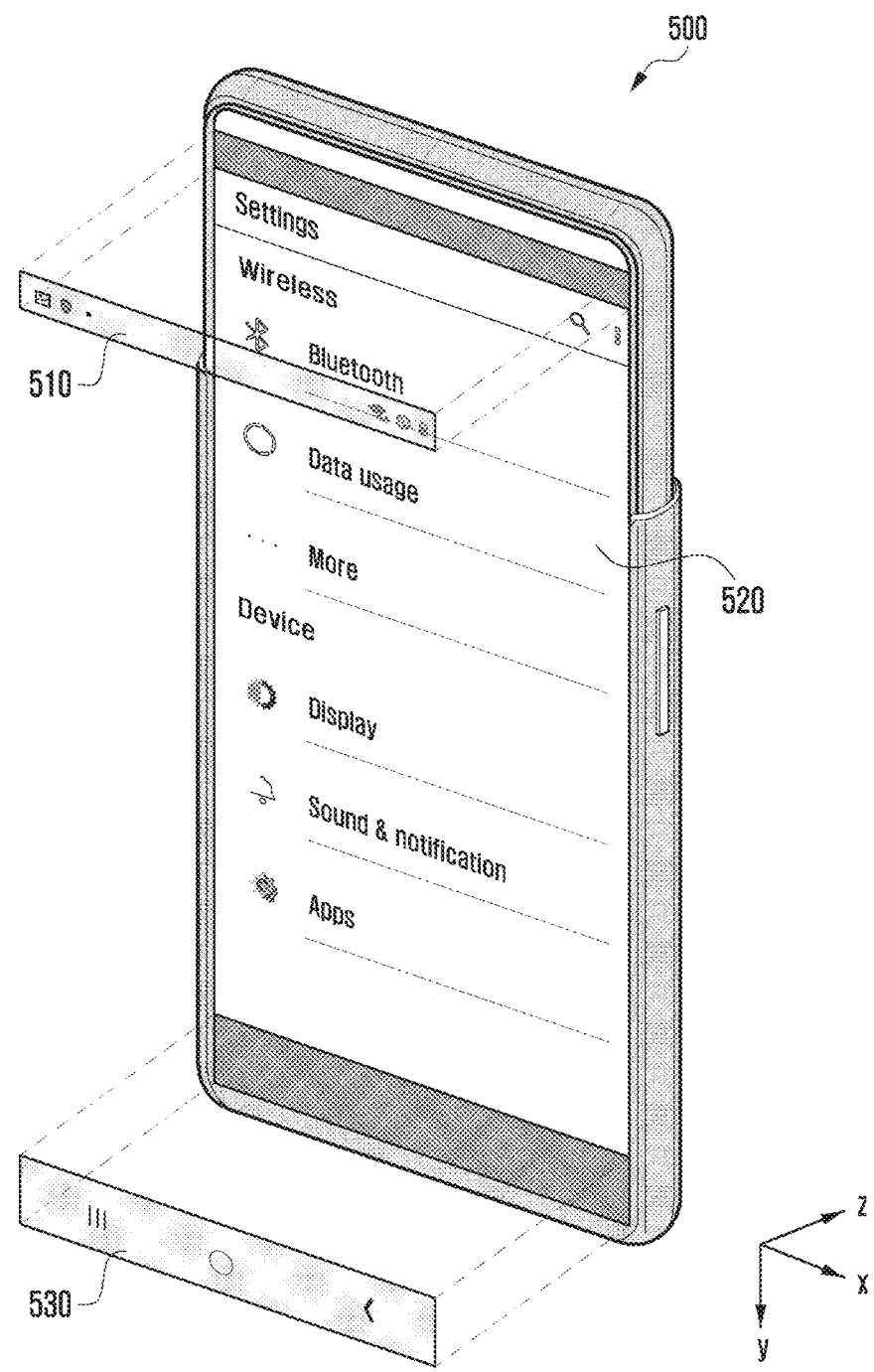
FIG. 5 illustrates an example in which an activation area of the electronic device is classified.

FIG. 5 illustrates an example in which an activation area 500 of the electronic device is classified.

With reference to FIG. 5, the activation area may be divided into a first area (or an upper end area) 510, a second area (or an intermediate area) 520, and a third area (or a lower end area) 530 in a vertical direction (y-axis direction). Information (e.g., time, a network connection state, a battery residual amount, or a notification icon), which indicates an operating state of the electronic device, may be provided through the first area (e.g., a status bar) 510. A screen of a foreground application, which is being executed, may be provided through the second area (e.g., an app window area) 520. One or more UI elements for movements (navigation) between the execution screens may be provided through the third area (e.g., a navigation bar) 530. The navigation bar is a user interface that may allow the user to navigate to a screen of a background application. For example, the navigation bar may include a button for allowing the user to navigate to an app that has been used recently, a button for allowing the user to navigate to a home screen, and a button for allowing the user to navigate to a previous screen. The foreground application may mean an application, the execution screen of which is being currently displayed through the display, among the applications being executed. The background application may mean an application, the execution screen of which is not displayed through the display, even though the application is being executed.

The classification of the area is not limited to the example in FIG. 5. For example, the activation area 500 may be divided into the second area 520 and the third area 530 without the first area 510 or divided into the first area 510 and the second area 520 without the third area 530. Alternatively, the processor (e.g., the processor 120 in FIG. 1) may configure the entire activation area 500 without dividing the area or configure the second area 520 and the third area 530 (or the first area 510 and the second area 520) as an app window area for displaying an application execution screen and display the application execution screen in the configured app window area. The processor may configure the entire activation area 500 as the app window area, configure the first area 520 as an area for displaying the status bar, and configure the third area 530 as an area for displaying the navigation bar, and the processor may designate the navigation bar and the status bar to layers higher than the application execution screen in the order in which the navigation bar, the status bar, and the application execution screen are displayed. Therefore, in the execution screen, a portion, which deviates from the second area 520 and is positioned in the third area 530, may be covered by the navigation bar. A portion, which deviates from the second area 520 and is positioned in the first area 530, may also be covered by the status bar. A separate area may be positioned on the side surface in addition to the upper or lower end of the screen.

Figure 6A:
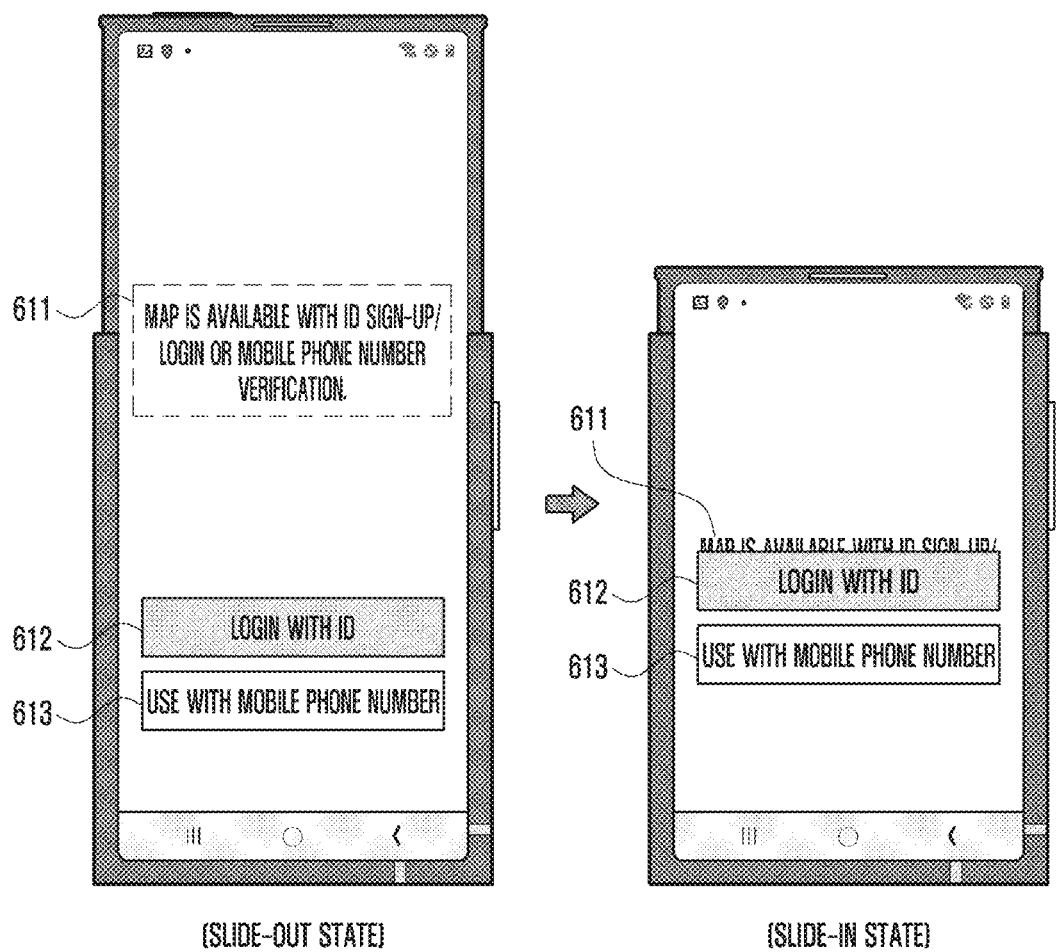
FIGS. 6A, 6B, and 6C illustrate examples in which a consistency problem occurs when the electronic device switches from a slide-out state to a slide-in state.
Figure 6B:
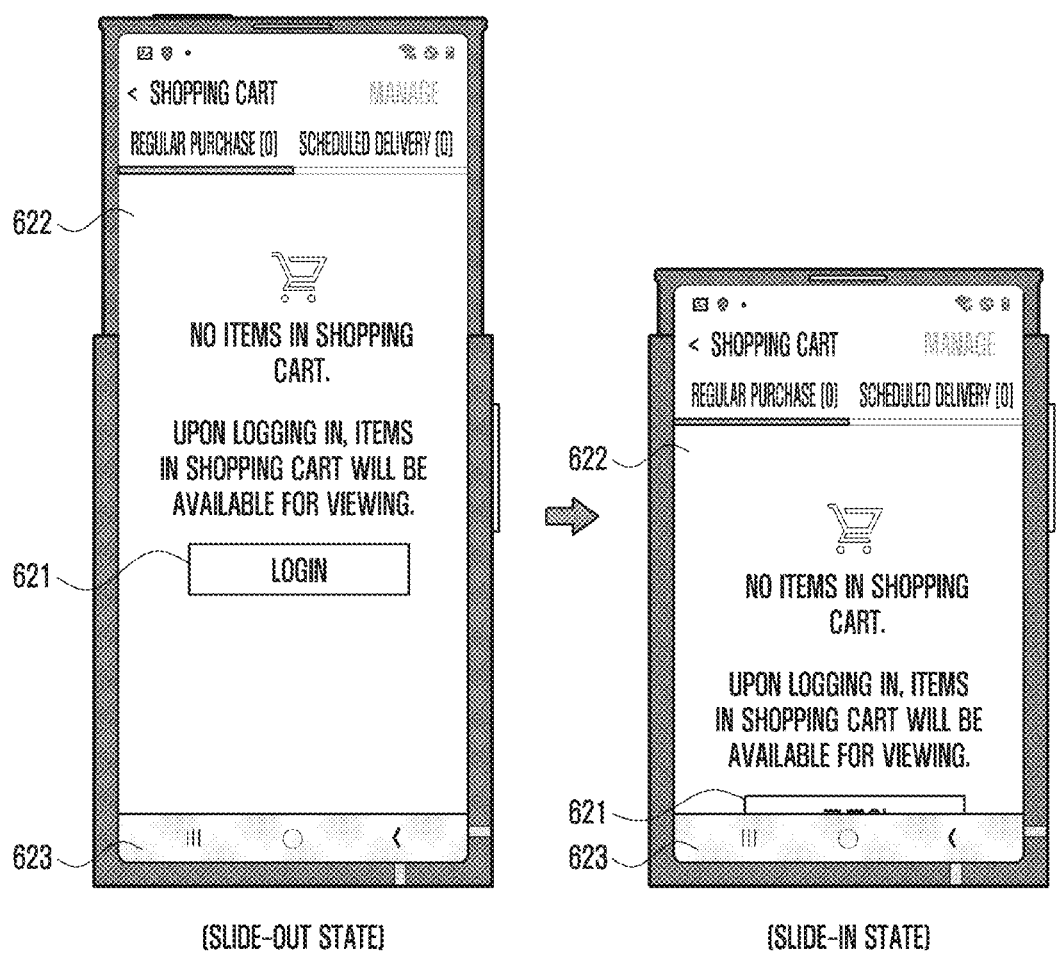
Figure 6C:
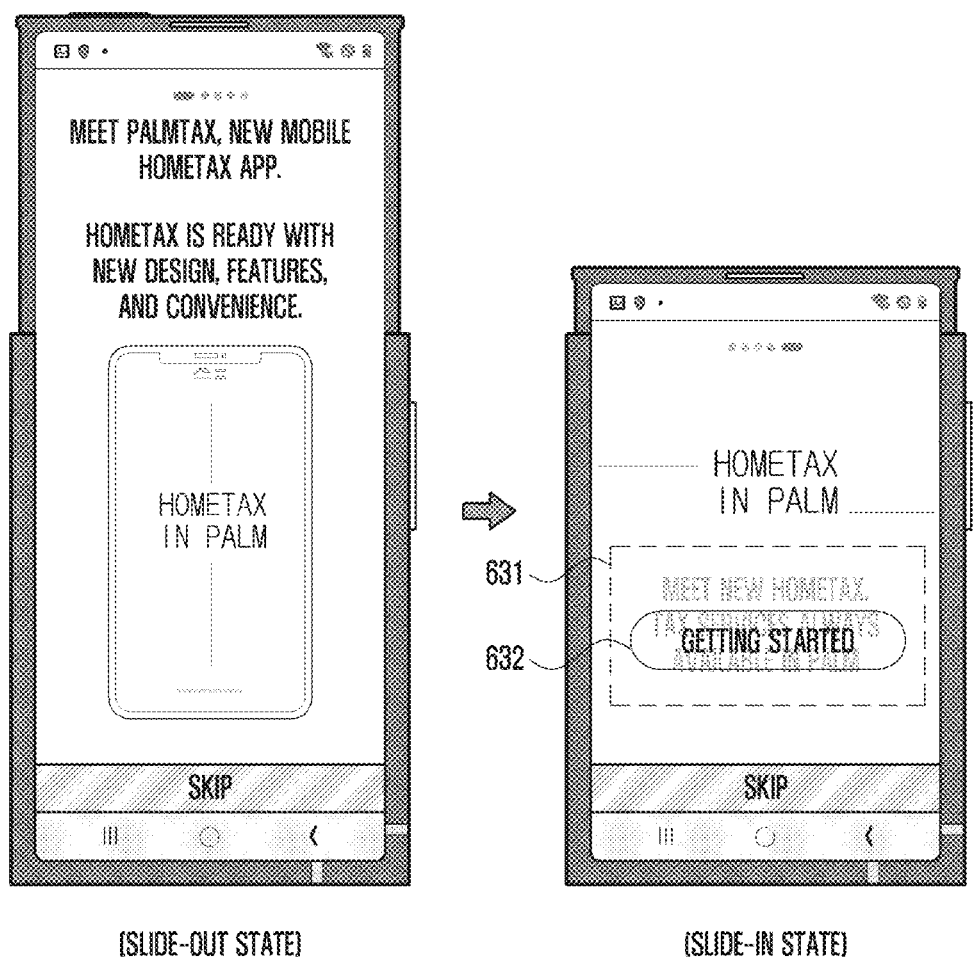

FIGS. 6A, 6B, and 6C illustrate examples in which a consistency problem occurs when the electronic device switches from the slide-out state to the slide-in state.

A layout (e.g., a size of the UI element, a size of a content in the UI element, and/or a position of the UI element) of the application execution screen may be changed by a change in size of the activation area. For example, an interval between the UI elements may decrease as the activation area is contracted. In case that the activation area is contracted continuously (e.g., when the electronic device is in the slide-in state), a consistency problem may occur. With reference to FIG. 6A, the arrangement of UI elements 611, 612, and 613 may be optimized for the slide-out state and displayed. When the electronic device switches from the slide-out state to the slide-in state, a first UI element 611 is positioned below a second UI element 612, which makes it difficult to clearly recognize what the content of the first UI element 611 is. With reference to FIG. 6B, when the electronic device switches from the slide-out state to the slide-in state, a part of the UI element 621 deviates from an app window area 622, such that the content of the UI element 621 may be invisible. With reference to FIG. 6C, in case that the electronic device switches from the slide-out state to the slide-in state, new UI elements 631 and 632 may be provided through the app window area and overlap each other.

Figure 7:
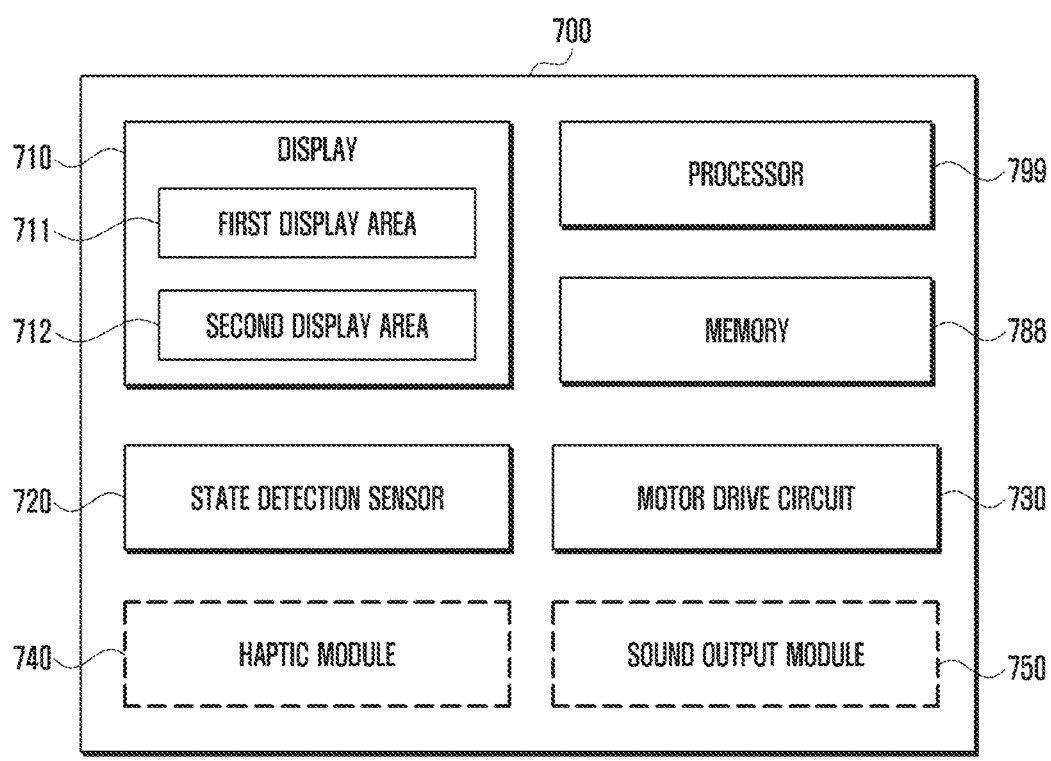
FIG. 7 illustrates an electrical block configuration of the electronic device having the sliding structure according to an example embodiment.

FIG. 7 illustrates an electrical block configuration of an electronic device 700 having a sliding structure according to an example embodiment. The electronic device 700 (e.g., the electronic device 101 in FIG. 1) may be configured to change a layout of an application execution screen in accordance with a change in the activation area of the display (an increase or decrease in size of the activation area) and provide the application execution screen with the changed layout through the app window area in the activation area. In case that a consistency problem occurs in the application execution screen with the changed layout, the electronic device 700 may be configured to increase the size of the activation area to solve the consistency problem. With reference to FIG. 7, the electronic device 700 may include a touch-sensitive display 710, a state detection sensor 720, a motor driving circuit 730, a memory 788, and a processor 799.

The display 710 may be divided into a first display area 711 and a second display area 712. For example, the first display area 711 may be a portion kept visually exposed through the front surface of the electronic device 700, and the second display area 712 may be a portion retracted into the electronic device 700 or moved to and disposed on the rear surface. As another example, both the first display area 711 and the second display area 712 may be retracted into the electronic device 700, and the first display area 711 may be a minimum or small area (e.g., the first display area 431 in FIG. 4) that is retracted first before the second display area 712 and designated to the activation area in which visual information is to be displayed. In the display 710, the activation area may be determined as a portion visually exposed to the user. For example, in accordance with the state (e.g., the slide-in state, the slide-out state, or the intermediate state) of the electronic device 700, the activation area may be determined as the first display area 711, a part of the first and second display areas 711 and 712, or the entire display 710 (e.g., the first display area 711 and the second display area 712).

The state detection sensor 720 (e.g., the sensor module 176 in FIG. 1) may recognize the state (e.g., the slide-in state, the slide-out state, or the intermediate state) of the electronic device 700 and generate data used to determine the activation area in which visual information is to be displayed. For example, the state detection sensor 720 may include a sensor (e.g., an encoder or a Hall sensor) attached to the roller and configured to generate and output data corresponding to a rotation angle of the roller when the roller is rotated by a force transmitted from the motor or a force transmitted from the user through the slider. As another example, the state detection sensor 720 may include a sensor (e.g., a pressure sensor) disposed on a designated portion of the display 710 (e.g., the second display area 232 in FIG. 2 or the second display area 332 in FIG. 3) and configured to generate data corresponding to a curvature of the corresponding portion.

According to an example embodiment, the motor driving circuit 730 may rotate the roller by operating the motor disposed in the electronic device 700 under the control of the processor 799. The retractable portion of the slider may enter the inside of the housing or be extended from the inside of the housing by the rotation of the roller. For example, the processor 799 may control the motor driving circuit 730 to switch the state in response to a user input to a button (e.g., a button disposed on the side surface of the electronic device 700 or a button displayed on the display 710) for switching the state or in order to solve the consistency problem. The motor driving circuit 730 may switch the state of the electronic device 500 from the slide-in state to the slide-out state or vice versa by rotating the roller under the control of the processor 799.

The electronic device 700 may further include a haptic module 740 (e.g., the haptic module 179 in FIG. 1). Instructions may allow the processor 799 to perform an operation of notifying the user that there is a consistency problem by using the haptic module 740, as a tactile means, in addition to a visual notification using the display 710.

The portable electronic device 700 may further include a sound output module 750 (e.g., the sound output module 155 in FIG. 1). Instructions may allow the processor 799 to perform an operation of notifying the user that there is a consistency problem by using the sound output module 750 as an auditory means. Instructions may allow the processor 499 to perform the notification by using a combination of two or more of visual, auditory, and tactile means.

The memory 788 may store visual information to be displayed in the activation area. For example, the visual information may include a background element and a user interface (UI) element (e.g., a user experience (UX) element, a foreground element, or a view). The UI element is a graphic element that allows the electronic device 500 and the user to interact with each other. For example, the UI element may include videos, images, guides (e.g., visual cues) related to changes in size of the activation area, guides related to an extension of the activation area, texts, thumbnails, emoticons, icons, keypad, buttons, or menus. The UI element may be operatively connected, directly or indirectly, to a particular function. Therefore, the processor 799 may execute the function connected to the UI element in response to the user's touch input to the UI element. The background element is a graphic element that is irrelevant to the interaction between the electronic device 700 and the user and is not connected to a particular function. For example, the background element may include a background image or a text. The visual information may include an application execution screen including a plurality of UI elements. For example, an application (e.g., the application 146 in FIG. 1) stored in the memory 788 may provide the processor 799 with the UI elements that constitute the application execution screen.

The memory 788 may store layout information used to constitute visual information to be displayed in the activation area. For example, the application (e.g., the application 146 in FIG. 1) stored in the memory 788 may provide the processor 799 with a resource file (e.g., an xml file) including layout information used to determine a size of the UI element, a magnitude of the content (e.g., a font size or the amount of text) included in the UI element, and a position of the UI element on the application execution screen. The application may provide the processor 799 with first layout information optimized for an aspect ratio (ratio of width to height) in the activation area (or the app window area) when the electronic device 700 is in the slide-out state. The application may provide the processor 799 with second layout information optimized for an aspect ratio of the activation area (or the app window area) when the electronic device 700 is in the slide-in state. The processor 799 may configure the application execution screen on the basis of the layout information and display the application execution screen in the activation area (or the app window area).

The processor 799 (e.g., the processor 120 in FIG. 1) may be configured to perform operations stored as instructions in the memory 788. The operations of the processor 799 will be described below specifically.

The processor 799 may recognize a change in state of the electronic device 700 on the basis of data received from the state detection sensor 720 and extend or contract the activation area in response to the change in state of the electronic device 700 in real time or hysteresis. As an example of the real-time reaction, the processor 799 may recognize a portion exposed to the outside from the second display area 712 (or moved in position to the front surface) and extend the activation area from the first display area 711 to the exposed portion of the second display area 712. The processor 799 may extend the activation area from the first display area 711 to the entire area (the first display area 711 and the second display area 712) of the display 710 when the entire second display area 712 is exposed (or moved in position to the front surface). The processor 799 may recognize a portion entering the internal space from the second display area 712 (or moving in position to the rear surface) and exclude the recognized portion from the activation area. The processor 799 may exclude the entire second display area 712 from the activation area when the entire second display area 712 enters the internal space (or moves in position to the rear surface). As an example of the hysteresis reaction, the processor 799 may extend the activation area from the first display area 711 to the entire area (the first display area 711 and the second display area 712) of the display 710 when the entire second display area 712 is exposed.

When the electronic device 700 is in the slide-out state, the processor 799 may determine the size of the UI element of the application execution screen and the position of the UI element on the app window on the basis of the layout information (e.g., the first layout information) and display the size of the UI element and the position of the UI element in the app window area. When the activation area is contracted, the processor 799 may change the layout of the application execution screen (e.g., the size of the UI element, the size of the content in the UI element, and/or the position of the UI element) and display the application execution screen with the changed layout in the app window area. The processor 799 may determine whether a consistency problem has occurred on the basis of the result of changing the layout. According to an example embodiment, the processor 799 may determine whether there is a consistency problem on the execution screen on the basis of the layout information of the application execution screen provided through the app window area while the electronic device 700 is in the slide-in state or the intermediate state. For example, the processor 799 may determine a situation in which the UI elements overlap one another as a consistency problem. The processor 799 may determine a situation in which at least a part of the UI element is not included in the app window area and the UI element is invisible to the user as a consistency problem.

Figure 8:
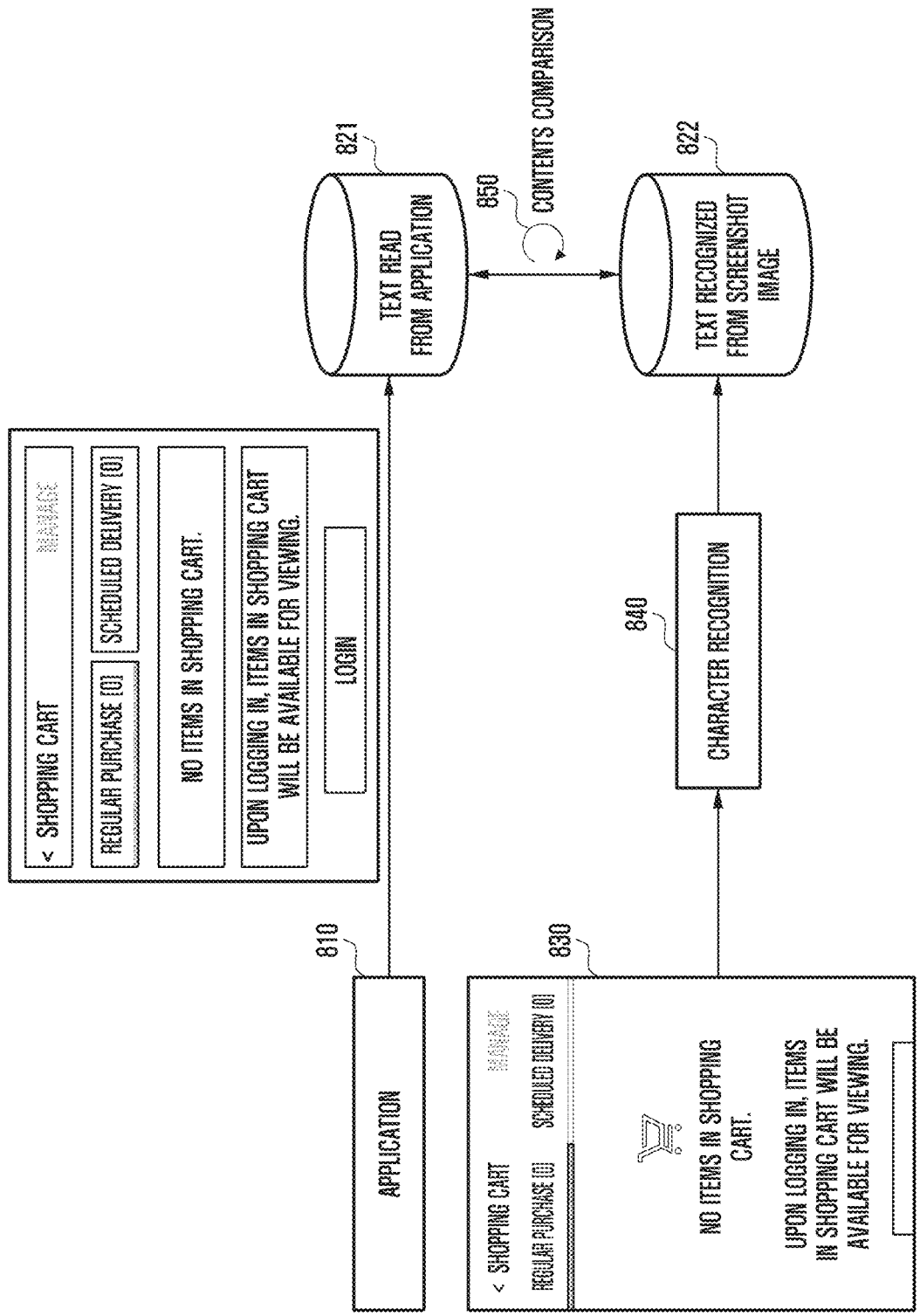
FIG. 8 is a view for explaining operations of a processor according to an example embodiment for determining whether a consistency problem occurs.

FIG. 8 is a view for explaining operations of the processor 799 according to an example embodiment for determining whether a consistency problem occurs.

With reference to FIG. 8, an application 810 may provide the processor 799 with the execution screen and the layout information optimized for the slide-out state. The processor 799 may acquire a first text 821 from the execution screen received from the application 810 and store the first text 821 in the memory 788. In the slide-out state, the processor 799 may determine the size of the UI element of the application execution screen and the position of the UI element on the app window on the basis of the layout information received from the application 810 and display the size of the UI element and the position of the UI element in the app window area. When the activation area is contracted, the processor 799 may change the layout of the application execution screen (e.g., the size of the UI element, the size of the content in the UI element, and/or the position of the UI element) and display the application execution screen with the changed layout in the app window area. When the size of the activation area is changed in the direction in which the activation area is contracted, the processor 799 may create a screenshot image 830 by capturing the app window area. The processor 799 may extract a second text 822 by performing optical character recognition (OCR) or character recognition 840, which uses an artificial intelligence model generated by machine learning, on the screenshot image 830. The processor 799 may store the second text 822 in the memory 788. The processor 799 may compare (850) the first text 821 and the second text 822 and determine whether there is a consistency problem on the execution screen on the basis of the comparison result. For example, the processor 799 may determine a situation in which the two texts 821 and 822 are inconsistent as a consistency problem. Alternatively, the processor 799 may determine that there is a consistency problem on the execution screen in case that a consistency ratio between the two texts 821 and 822 is equal to or smaller than a predetermined reference value.

In case that the processor 799 determines that there is a consistency problem on the execution screen displayed in the app window area, the processor 799 may perform an operation of solving the consistency problem. According to an example embodiment, the activation area may be automatically extended. For example, the processor 799 may control the motor driving circuit 730 to increase the activation area by one step by a designated amount and then perform a consistency test as exemplarily described above. In case that there is still a consistency problem, the processor 799 may increase the activation area by one more step. In case that there is no consistency problem, the processor 799 may store an aspect ratio setting value, which indicates the size of the activation area, in a memory 388 and use this value for a subsequent operation of eliminating the consistency problem. For example, when a slide-in trigger for contracting the activation area occurs (e.g., in case that a user input to a contraction button disposed on the side surface of the electronic device 700 is received), the processor 799 may control the motor driving circuit 730 on the basis of the stored aspect ratio setting value to ensure that there is no consistency problem on the execution screen.

Figure 9A:
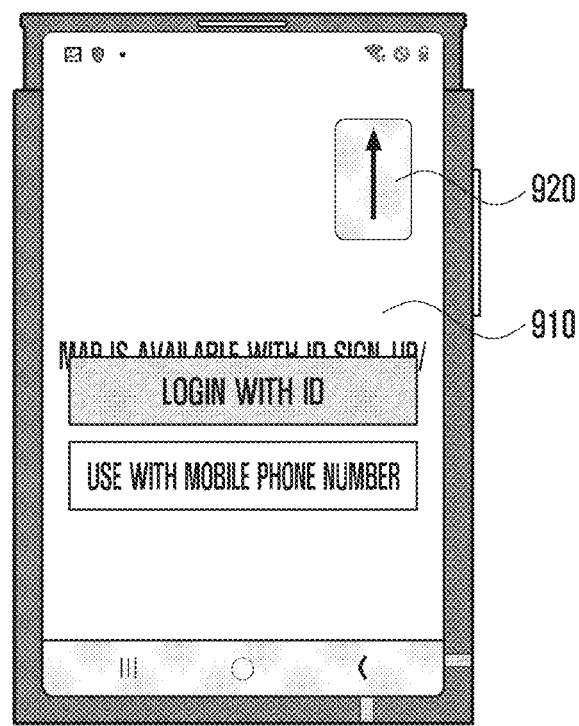
FIGS. 9A, 9B, and 9C are exemplified screen views for explaining operations of the processor according to an example embodiment for solving a consistency problem.
Figure 9B:
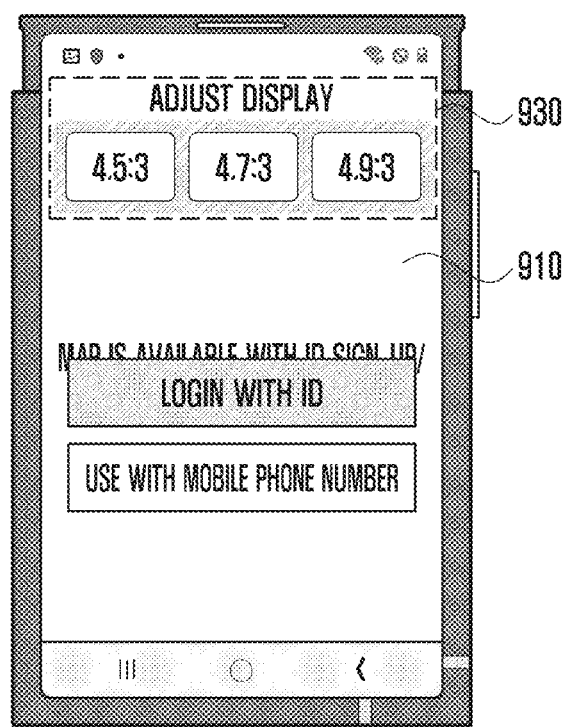
Figure 9C:
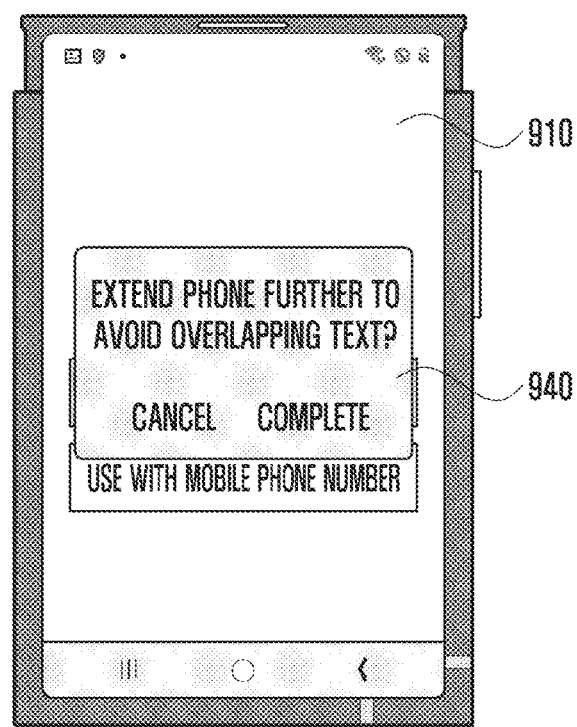

FIGS. 9A, 9B, and 9C are exemplified screen views for explaining operations of the processor 799 according to an example embodiment for solving a consistency problem.

With reference to FIGS. 9A to 9C, the processor 799 may provide an app window area 910 with a user interface capable of extending the activation area when a consistency problem occurs. According to an example embodiment, the processor 799 may display a selection item, which allows the user to select whether to extend the activation area, in the app window area 910. For example, the processor 799 may display an extension button 920, which is illustrated in FIG. 9A and includes an arrow directed toward the outside of the activation area, in the app window area 910. The processor 799 may display an aspect ratio selection menu 930, which is illustrated in FIG. 9B and indicates one or more aspect ratios of the activation area to be extended, in the app window area 910. In the aspect ratio selection menu 930, the aspect ratio may be provided on the basis of the aspect ratio setting value stored in the memory 388. The processor 399 may display a pop-up window 940, which is illustrated in FIG. 9C and allows the user to recognize a consistency problem on the execution screen and select whether to extend the activation area to solve the consistency problem, in the app window area 910.

When there is no user input to the selection items 920, 930, and 940 for a designated time after the selection items 920, 930, and 940 are displayed, the processor 799 may remove the selection items 920, 930, and 940 from the app window area 910 without extending the activation area. Alternatively, the processor 799 may remove the selection items 920, 930, and 940 from the app window area 910 without extending the activation area on the basis that a user input (e.g., a touch gesture for pushing the selection items 920 and 930 toward the side surface or the user's selection of a cancel button in the pop-up window 940) that requests the removal of the selection items 920, 930, and 940, is received through a display 788.

Figure 10:
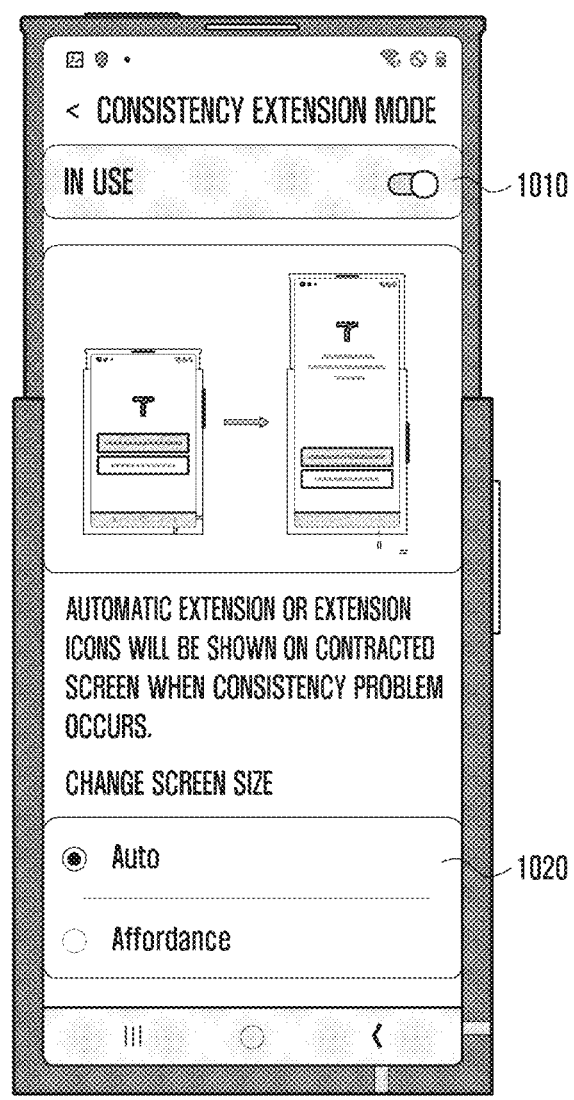
FIG. 10 is an exemplified screen view for explaining an operation of the processor according to an example embodiment for configuring whether to solve a consistency problem.

FIG. 10 is an exemplified screen view for explaining an operation of the processor 799 according to an example embodiment for configuring whether to solve a consistency problem.

With reference to FIG. 10, the processor 799 may display the configuration screen in the app window area by executing an application for configuring the electronic device 700. For example, in case that an item having the title 'consistency extension mode' is selected by the user, the processor 799 may display a configuration screen in the app window area, and the configuration screen may include a configuration item 1010, which allows the user to configure whether to extend the activation area to solve a consistency problem when the consistency problem occurs, and a configuration item 1020 that allows the user to select whether to automatically solve the consistency problem when the consistency problem resolution is selected as being enabled. In case that 'Affordance' is selected in the configuration item 1020, the processor 799 may display the selection items 920, 930, and 940 when a consistency problem occurs.

FIGS. 11A, 11B, 11C, and 11D are exemplified screen views for explaining operations of the processor 799 according to an example embodiment for solving a consistency problem without extending the activation area.

Figure 11A:
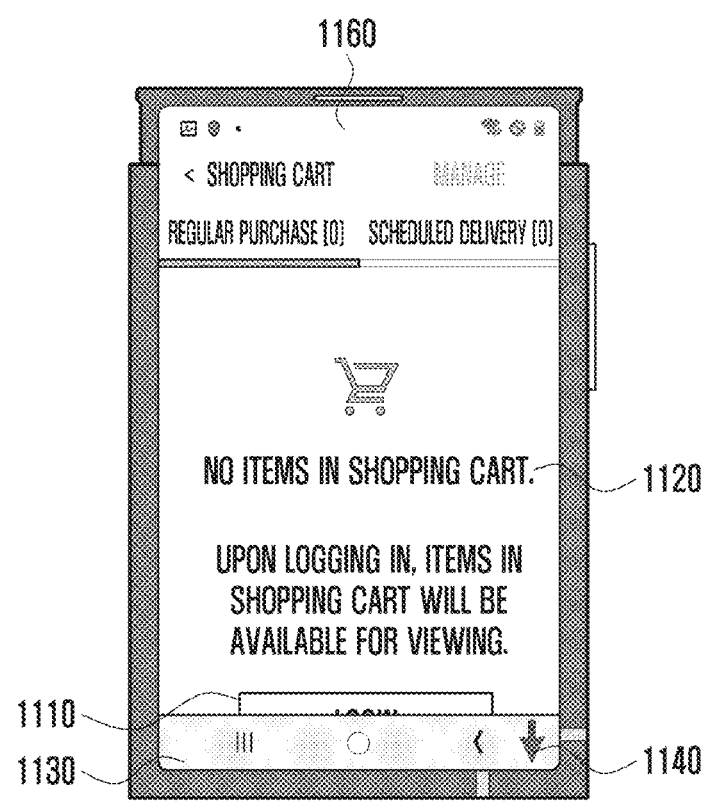
FIGS. 11A, 11B, 11C, and 11D are exemplified screen views for explaining operations of the processor according to an example embodiment for solving a consistency problem without extending the activation area.

With reference to FIG. 11A, as a result of changing the layout, there may occur a consistency problem in which at least a part of a UI element 1110 is invisible in an app window area 1120. For example, there may occur a consistency problem in which at least a part of the UI element 1110 exceeds a boundary of the app window area 1120 (e.g., a rim that adjoins a navigation bar 1130) and at least a part of the UI element 1110 is not included in the app window area 1120 or at least a part of the UI element 1110 is covered by another area (e.g., the navigation bar 1130) configured as a layer higher than the app window area 1120.

According to an example embodiment, the processor 799 may remove the navigation bar 1130 from the activation area and extend the app window area 1120 to a portion where the navigation bar 1130 has been positioned, such that the UI element 1110 may be clearly visible. In the case of the example in which the UI element 1110 is covered by the navigation bar 1130 as a result of configuring the navigation bar 1130 as a layer higher than the app window area 1120, the processor 799 may remove the navigation bar 1130 from the activation area so that the UI element 1110 is clearly visible. The processor 799 may increase transparency of the navigation bar 1130 instead of removing the navigation bar 1130, such that the UI element 1110 is visible.

Figure 11B:
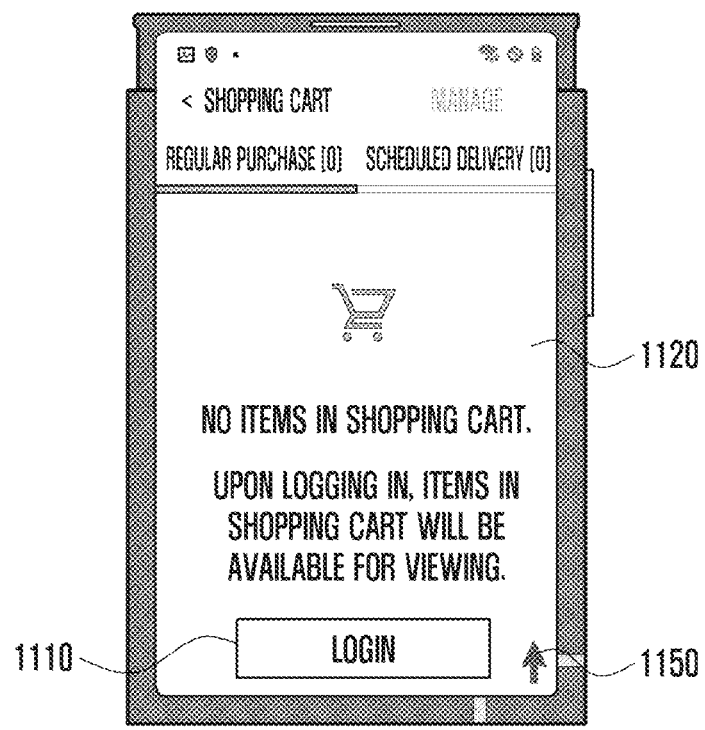

An example embodiment will be described with reference to FIGS. 11A and 11B. The processor 799 may display a selection item (e.g., an arrow directed toward the outside of the activation area) 1140, which allows the user to select whether to remove a navigation bar 1120, in the navigation bar 1120. When the selection item 1140 is selected, the processor 799 may remove the navigation bar 1120 from the activation area. The processor 799 may display a selection item (e.g., an arrow directed toward the inside of the activation area) 1150, which allows the user to select the indication of the navigation bar 1130, at a position at which the navigation bar 1120 has been positioned. When the selection item 1150 is selected, the processor 799 may display the navigation bar 1120 again or decrease the transparency to original transparency configured to the navigation bar 1120 before the selection item 1140 is selected.

Figure 11C:
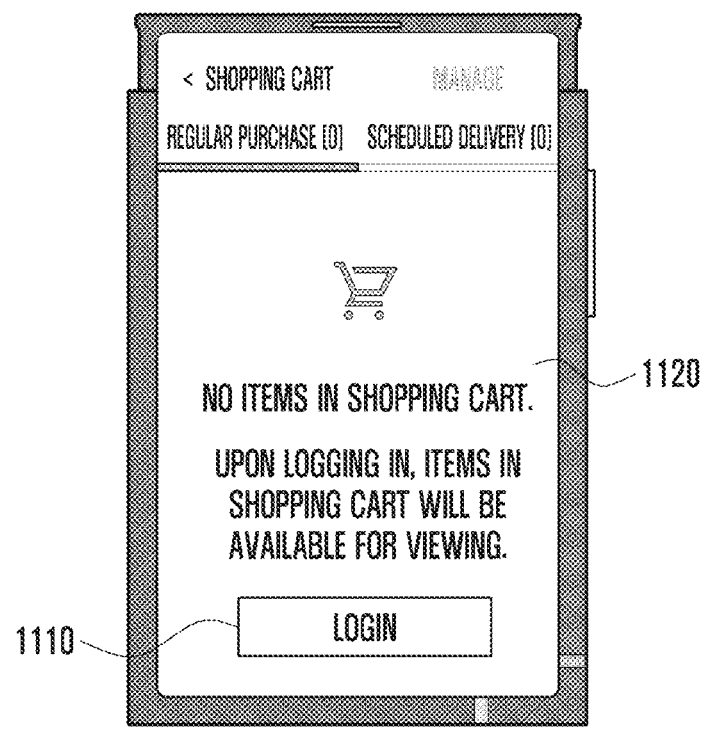

An example embodiment will be described with reference to FIGS. 11A and 11C. The processor 799 may remove a status bar 1160 at an upper end of the activation area and the navigation bar 1130 at a lower end of the activation area from the activation area and extend the app window area 1120 to the entire activation area, such that the UI element 1110 is clearly visible.

Figure 11D:
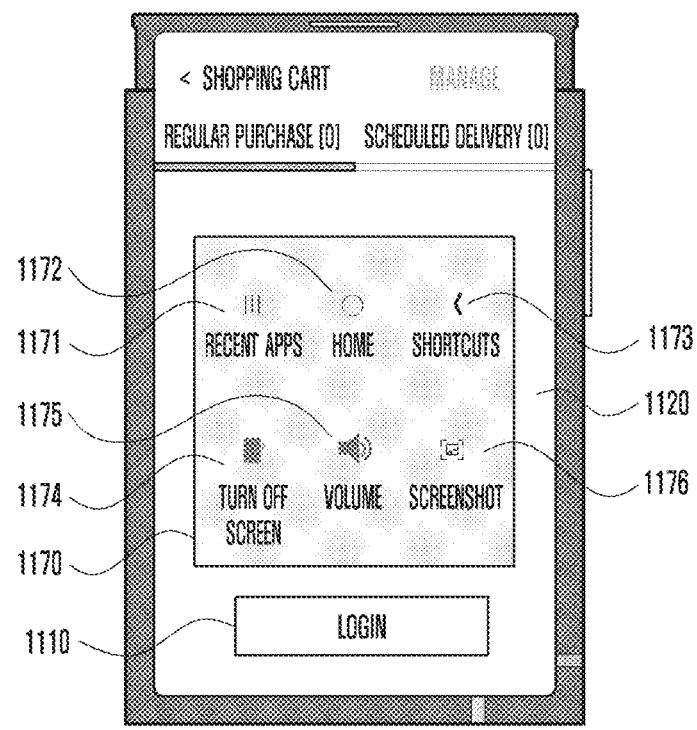

An example embodiment will be described with reference to FIGS. 11B and 11D. When the selection item 1150 is selected, the processor 799 may display a pop-up window (e.g., an assistant menu) 1170, which corresponds to the navigation bar 1120, in the app window area 1120 instead of displaying the navigation bar 1120. The processor 799 may increase transparency of the pop-up window 1170 so that the UI element disposed below the pop-up window 1170 is visible. The processor 799 may include a button 1171 for allowing the user to navigate to an app that has been used recently, a button 1172 for allowing the user to navigate to a home screen, and a button 1173 for allowing the user to navigate to a previous screen and display the buttons on the pop-up window 1170. The processor 799 may add a button for executing another function in addition to the navigation buttons 1171, 1172, and 1173 and display the button on the pop-up window 1170. For example, a button 1174 for turning off the screen, a button 1175 for adjusting sound volume, and a button 1176 for taking a screenshot may be displayed through the pop-up window 1170.

Figure 12:
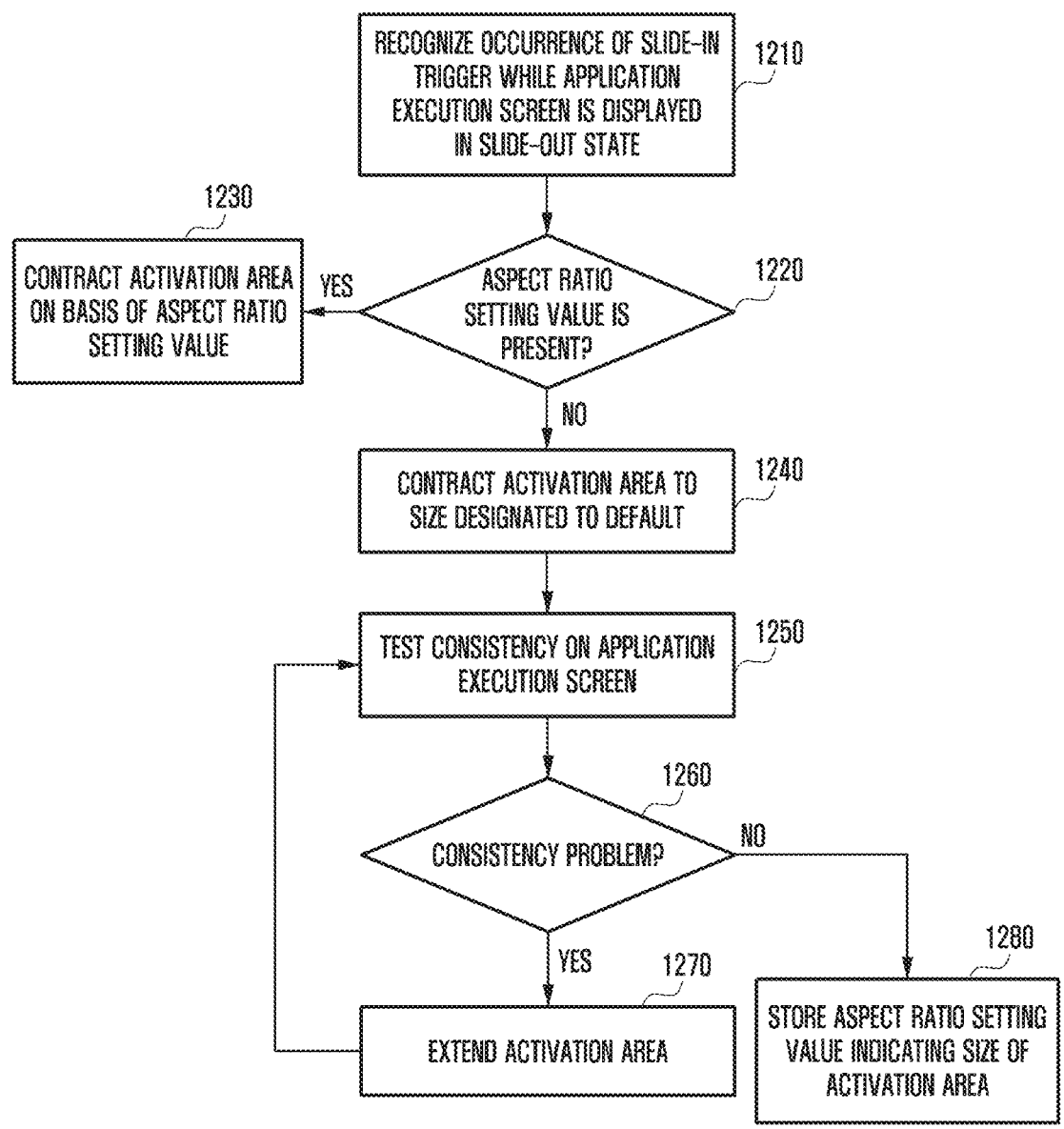
FIG. 12 is a flowchart for explaining operations of the processor according to an example embodiment for solving a consistency problem.

FIG. 12 is a flowchart for explaining operations of the processor 799 according to an example embodiment for solving a consistency problem.

At operation 1210, the processor 799 may recognize that the slide-in trigger for contracting the activation area occurs while the application execution screen is displayed in the activation area in the slide-out state. For example, the processor 799 may recognize the change in state to the slide-in state as the slide-in trigger by means of the state detection sensor 720. As another example, the processor 799 may recognize a user input to the button for switching the state (e.g., the button disposed on the side surface of the electronic device 700 or the button displayed on the display 710) as the slide-in trigger.

At operation 1220, in response to the occurrence of the slide-in trigger, the processor 799 may determine whether the aspect ratio setting value corresponding to the application execution screen being currently displayed is stored in the memory 788. In case that the corresponding aspect ratio setting value is present in the memory 788, the processor 799, at operation 1230, may contract the activation area on the basis of the aspect ratio setting value to ensure that there is no consistency problem on the execution screen.

In case that the corresponding aspect ratio setting value is not present in the memory 788, the processor 799, at operation 1240, may contract the activation area to a size (e.g., a minimum size) designated to default.

After the contraction of the activation area, the processor 799, at operation 1250, may evaluate the consistency of the application execution screen. At operation 1260, the processor 799 may determine whether the evaluation result indicates that there is a consistency problem. As described above, operations 1250 and 1260 may use a method of determining whether there is a consistency problem on the execution screen on the basis of the layout of the application execution screen or a consistency determination method described with reference to FIG. 8.

When the processor 799 determines that there is a consistency problem, the processor 799, at operation 1270, may control the motor driving circuit 730 to increase the activation area by one step by a designated size and then perform the consistency test (operation 1250) again. In case that there is still a consistency problem (operation 1260, YES), the processor 799 may increase the activation area by one more step (operation 1270).

When the processor 799 determines that there is no consistency problem, the processor 799, at operation 1280, may store the aspect ratio setting value, which indicates the size of the activation area, in the memory 388 and use this value later (e.g., at the time of performing operation 1230).

Figure 13:
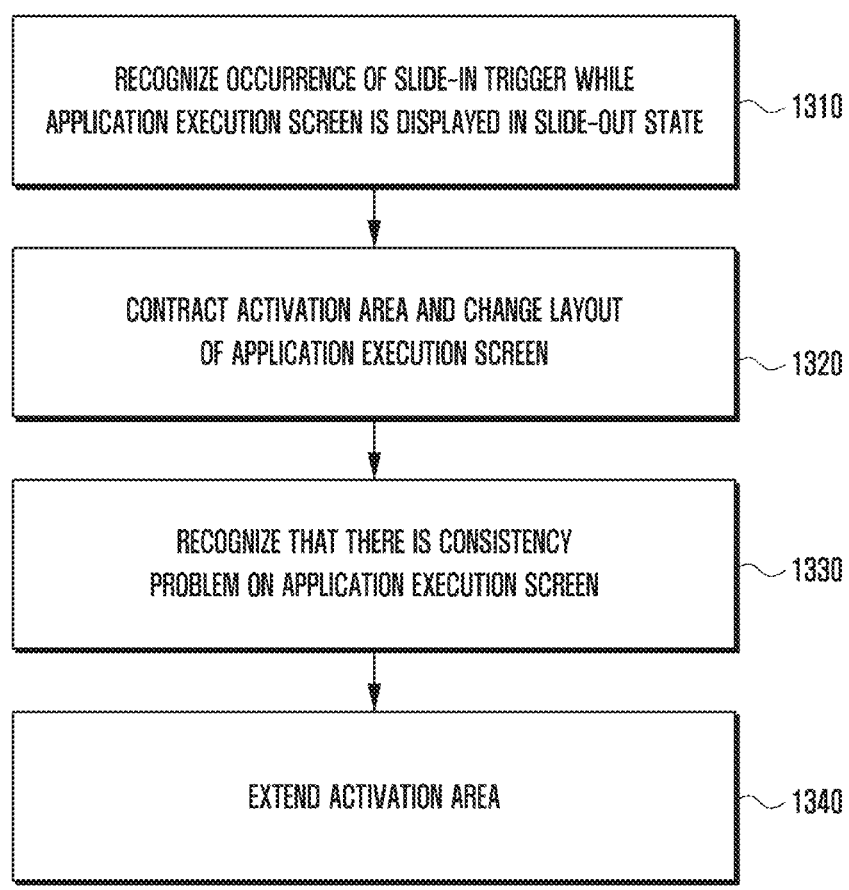
FIG. 13 is a flowchart for explaining operations of the processor according to an example embodiment for solving a consistency problem.

FIG. 13 is a flowchart for explaining operations of the processor 799 according to an example embodiment for solving a consistency problem.

At operation 1310, the processor 799 may recognize that the slide-in trigger for contracting the activation area occurs while the electronic device is in the slide-out state and the application execution screen is displayed in the area (e.g., the app window area) designated to display the application execution screen in the activation area. For example, the processor 799 may recognize the change in state to the slide-in state as the slide-in trigger by means of the state detection sensor 720. As another example, the processor 799 may recognize a user input to the button for switching the state (e.g., the button disposed on the side surface of the electronic device 700 or the button displayed on the display 710) as the slide-in trigger.

At operation 1320, the processor 799 may contract the activation area (e.g., the slide-in state) in response to the occurrence of the slide-in trigger and change the layout of the application execution screen (e.g., the size of the UI element, the position of the UI element, and/or the size of the content in the UI element) in accordance with the aspect ratio of the contracted size.

After the layout is changed, the processor 799, at operation 1330, may recognize that there is a consistency problem on the application execution screen. As described above, operation 1330 may use a method of determining whether there is a consistency problem on the execution screen on the basis of the layout of the application execution screen or a consistency determination method described with reference to FIG. 8.

At operation 1340, the processor 799 may extend the activation area to solve the consistency problem.

Figure 14:
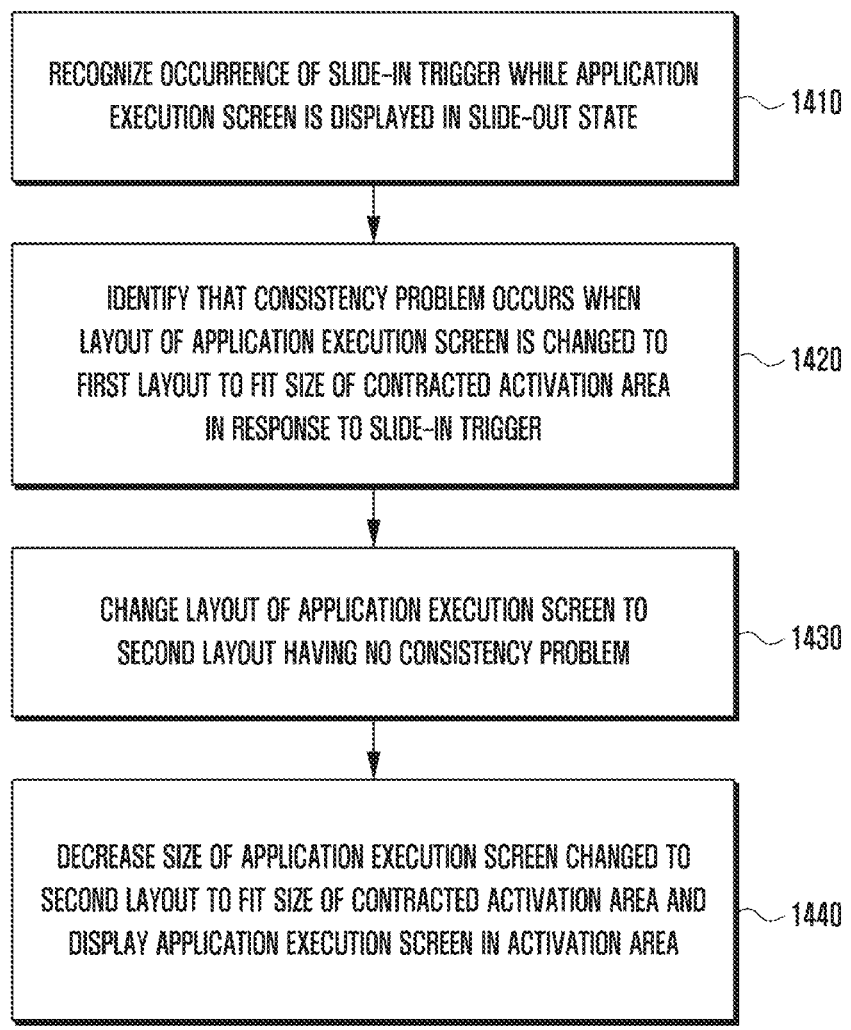
FIG. 14 is a flowchart for explaining operations of the processor according to an example embodiment for solving a consistency problem without extending the activation area.
Figure 15A:
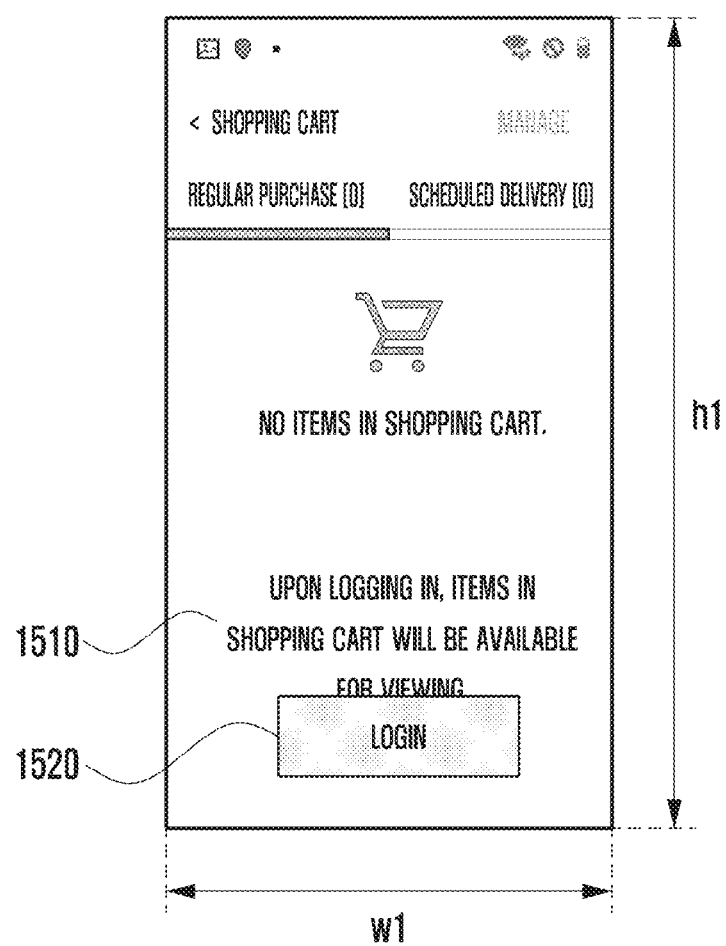
FIGS. 15A, 15B, and 15C are exemplified screen views for explaining operations of a processor(s) according to an example embodiment for solving a consistency problem without extending the activation area.
Figure 15B:
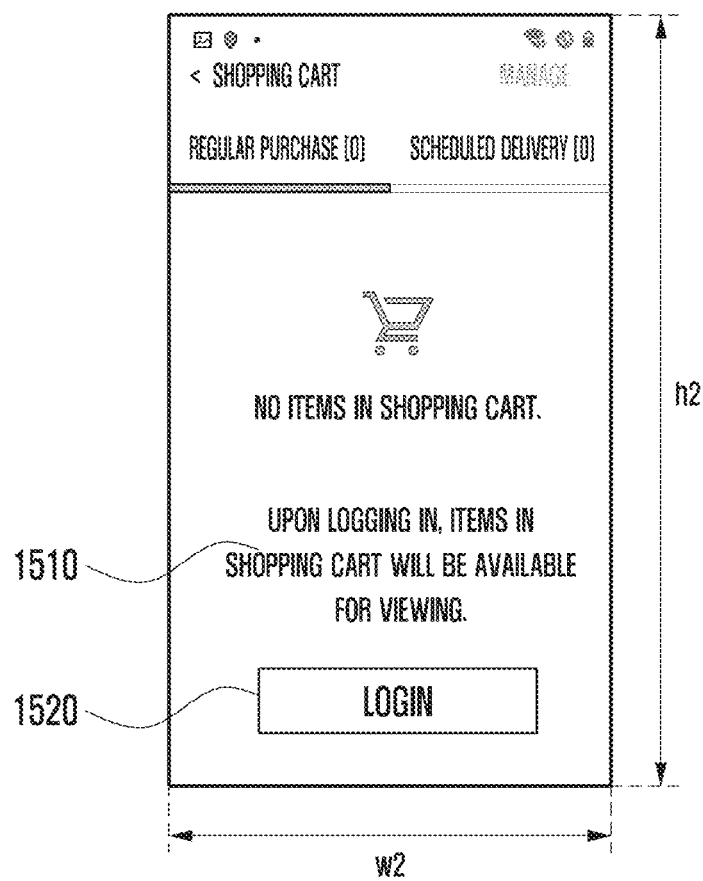
Figure 15C:
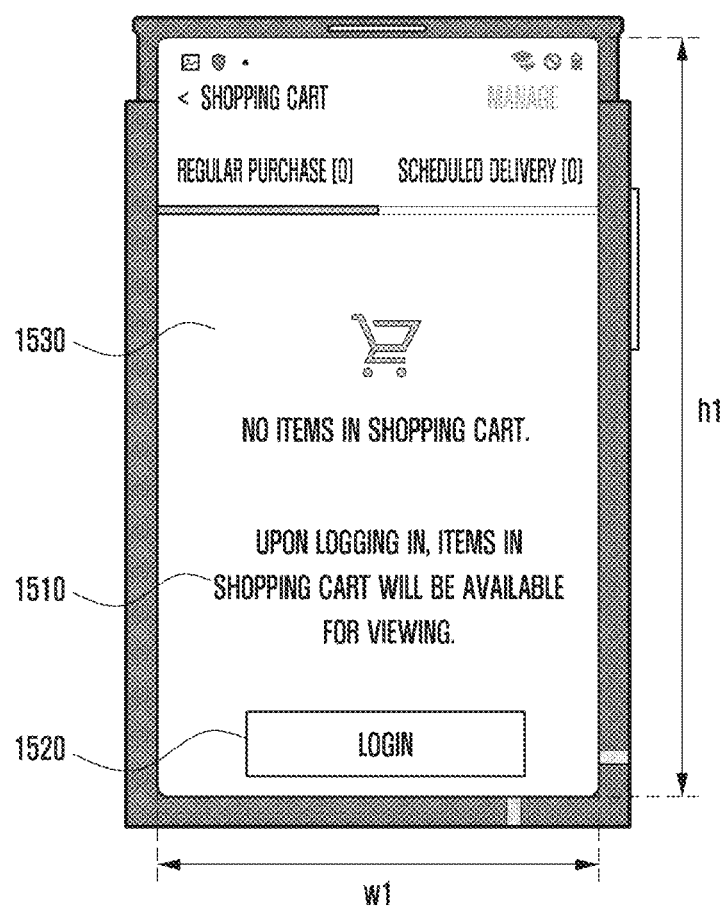

FIG. 14 is a flowchart for explaining operations of the processor 799 according to an example embodiment for solving a consistency problem without extending the activation area. FIGS. 15A, 15B, and 15C are exemplified screen views for explaining operations of a processor 799 according to an example embodiment for solving a consistency problem without extending the activation area.

At operation 1410, the processor 799 may recognize that the slide-in trigger for contracting the activation area occurs while the application execution screen is displayed in the activation area in the slide-out state. For example, the processor 799 may recognize the change in state to the slide-in state as the slide-in trigger by way of the state detection sensor 720. As another example, the processor 799 may recognize a user input to the button for switching the state (e.g., the button disposed on the side surface of the electronic device 700 or the button displayed on the display 710) as the slide-in trigger.

At operation 1420, the processor 799 may identify that a consistency problem occurs on the application execution screen (e.g., a problem in which the US elements overlap one another and/or a problem in which a part of the UI element is invisible in the app window area) in case that the layout of the application execution screen is changed to a first layout to fit the size of the activation area contracted by the slide-in trigger. For example, as illustrated in FIG. 15A, the activation area may be contracted in a longitudinal direction. Therefore, the processor 799 may fix a width (or a horizontal length) of the application execution screen to w1 and decrease a height (or a vertical length) of the application execution screen to h1 to fit a height of the contracted activation area. With the decrease in height, the processor 799 may rearrange the UI elements in the application execution screen (e.g., decrease the interval). The processor 799 may identify that a consistency problem occurs on the application execution screen as a result of the rearrangement. For example, the processor 799 may identify a consistency problem in which a part of a first UI element 1510 is covered by a second UI element 1520 in the contracted application execution screen.

At operation 1430, the processor 799 may change a layout of the application execution screen to a second layout having no consistency problem on the basis that the consistency problem is identified. For example, as illustrated in FIG. 15B, the processor 799 may increase a height of the application execution screen from h1 to h2. Additionally, the processor 799 may increase a width of the application execution screen from w1 to w2 by a ratio of h1/h2. With the increase in height, the processor 799 may rearrange the UI elements in the application execution screen (e.g., increase the interval). The processor 799 may identify that the consistency problem on the application execution screen is solved as a result of the rearrangement. For example, the processor 799 may identify that the consistency problem is solved as the interval between the first UI element 1510 and the second UI element 1520 increases.

At operation 1440, the processor 799 may decrease the size (or the scale) of the application execution screen changed to the second layout to fit the size of the contracted activation area and display the application execution screen in the activation area. For example, as illustrated in FIG. 15C, the processor 799 may decrease the size (h2*w2) of the application execution screen to fit a size (h1*w1) of an activation area 1530. The height of the UI elements in the application execution screen may be decreased by the ratio of h1/h2, and the width of the UI elements may be decreased by a ratio of w1/w2. Because all the sizes of the UI elements in the application execution screen are decreased by the same ratio, the application execution screen may be displayed in the contracted activation area without a consistency problem.

According to an example embodiment, a portable electronic device (e.g., the electronic device 101 or the electronic device 700) may include: a first housing; a second housing disposed to be slidable relative to the first housing; a flexible display in which a display area of the display is contracted or extended on the basis of slide-in or slide-out driving of the second housing; a motor configured to generate driving power for sliding the second housing; a driving circuit configured to operate the motor; and at least one processor (e.g., the processor 120 or the processor 799) operably connected, directly or indirectly, to the driving circuit and the flexible display. The at least one processor may configure the display area of the flexible display as an activation area in which visual information is displayed. The at least one processor may recognize the occurrence of a slide-in trigger for contracting the activation area while an application execution screen is displayed in the activation area in a slide-out state. The at least one processor may identify whether a consistency problem occurs on the application execution screen when a state is switched from the slide-out state to a slide-in state on the basis of the occurrence of the slide-in trigger. The at least one processor may provide a user interface capable of extending the activation area when the consistency problem occurs.

The at least one processor may control the driving circuit to contract the activation area and change a layout of the application execution screen. The at least one processor may recognize that there occurs a consistency problem in which UI elements overlap one another on the application execution screen with the changed layout or a part of the UI element is invisible in an app window area designated to display the application execution screen. The at least one processor may control the driving circuit to extend the activation area on the basis that the occurrence of the consistency problem is recognized.

The at least one processor may determine that there is a consistency problem on the application execution screen on the basis of sizes and positions of the UI elements.

The at least one processor may acquire a first text from an application execution screen received from an application. The at least one processor may create a screenshot image by capturing the application execution screen displayed in the app window area. The at least one processor may extract a second text from the screenshot image. The at least one processor may compare the first text and the second text, and determine that there is a consistency problem on the application execution screen displayed in the app window area on the basis of the comparison result.

The at least one processor may extend the activation area on the basis that the extension of the activation area is selected through the user interface.

The at least one processor may include an arrow directed toward the outside of the activation area, information indicating an aspect ratio of the activation area to be extended, or information for notifying the consistency problem in the user interface, and display the arrow and the information in the activation area.

The at least one processor may display a configuration item, which allows a user to configure whether to solve a consistency problem when the consistency problem occurs, in the activation area. The at least one processor may extend the activation area on the basis that the occurrence of the consistency problem is recognized after the consistency problem is configured to be solved through the configuration item.

The at least one processor may identify an aspect ratio setting value corresponding to the application execution screen in the memory in response to the occurrence of the slide-in trigger. The at least one processor may contract the activation area on the basis of the aspect ratio setting value.

According to an example embodiment, a portable electronic device (e.g., the electronic device 700 in FIG. 7) may include: a first housing; a second housing disposed to be slidable relative to the first housing; a flexible display in which a display area of the display is contracted or extended on the basis of slide-in or slide-out driving of the second housing; a motor configured to generate driving power for sliding the second housing; a driving circuit configured to operate the motor; and at least one processor (e.g., the processor 120 or the processor 799) operably connected, directly or indirectly, to the driving circuit and the flexible display. The at least one processor may configure the display area of the flexible display as an activation area. The at least one processor may configure a part of the activation area as an app window area in which the application execution screen is displayed. The at least one processor may recognize the occurrence of a slide-in trigger for contracting the activation area while an application execution screen is displayed in the app window area in a slide-out state. The at least one processor may control the driving circuit to contract the activation area and change a layout of the application execution screen on the basis of the occurrence of the slide-in trigger. The at least one processor may recognize that there occurs a consistency problem in which a part of a UI element in the application execution screen with the changed layout is invisible in the app window area designated to display the application execution screen. The at least one processor may remove another area of the activation area and extend the app window area to a position at which another area has been positioned on the basis that the occurrence of the consistency problem is recognized, such that a part of the UI element is visible.

The at least one processor may determine that there is a consistency problem on the application execution screen on the basis of sizes and positions of the UI elements on the application execution screen.

The at least one processor may acquire a first text from an application execution screen received from an application. The at least one processor may create a screenshot image by capturing the application execution screen displayed in the app window area. The at least one processor may extract a second text from the screenshot image. The at least one processor may compare the first text and the second text, and determine that there is a consistency problem on the application execution screen displayed in the app window area on the basis of the comparison result.

The at least one processor may display a first selection item, which allows a user to select removal of another area, in another area on the basis that the occurrence of the consistency problem is recognized. The at least one processor may remove another area and extend the app window area to a position at which another area has been positioned on the basis that the removal of another area is selected through the first selection item.

The at least one processor may display a second selection item, which allows the user to select displaying of another area, at a position at which another area has been positioned after another area is removed. The at least one processor may display another area on the basis that the displaying of another area is selected through the second selection item.

According to an example embodiment, a portable electronic device (e.g., the electronic device 700 in FIG. 7) may include: a first housing; a second housing disposed to be slidable relative to the first housing; a flexible display in which a display area of the display is contracted or extended on the basis of slide-in or slide-out driving of the second housing; a motor configured to generate driving power for sliding the second housing; a driving circuit configured to operate the motor; and at least one processor (e.g., the processor 120 or the processor 799) operably connected, directly or indirectly, to the driving circuit and the flexible display. The at least one processor may configure a part or the entirety of the activation area as an app window area in which the application execution screen is displayed. The at least one processor may recognize the occurrence of a slide-in trigger for contracting the activation area while an application execution screen is displayed in the app window area in a slide-out state. The at least one processor may control the driving circuit to contract the activation area and change a layout of the application execution screen on the basis of the occurrence of the slide-in trigger. The at least one processor may recognize that there occurs a consistency problem in which a part of a UI element in the application execution screen with the changed layout is invisible in the app window area designated to display the application execution screen. The at least one processor may remove another area, which is configured as a layer higher than the app window area and covers a part of the UI element or increase transparency of another area on the basis that the occurrence of the consistency problem is recognized.

The at least one processor may determine that there is a consistency problem on the application execution screen on the basis of sizes and positions of the UI elements on the application execution screen.

The at least one processor may acquire a first text from an application execution screen received from an application. The at least one processor may create a screenshot image by capturing the application execution screen displayed in the app window area. The at least one processor may extract a second text from the screenshot image. The at least one processor may compare the first text and the second text, and determine that there is a consistency problem on the application execution screen displayed in the app window area on the basis of the comparison result.

The at least one processor may display a first selection item, which allows a user to select removal of another area, in another area on the basis that the occurrence of the consistency problem is recognized. The at least one processor may remove another area or increase transparency of another area on the basis that the removal of another area is selected through the first selection item.

The at least one processor may display a second selection item, which allows the user to select displaying of another area, at a position at which another area has been positioned after another area is removed or the transparency is increased. The at least one processor may display another area or decrease transparency on the basis that the displaying of another area is selected through the second selection item.

According to an example embodiment, a portable electronic device (e.g., the electronic device 700 in FIG. 7) may include: a first housing; a second housing disposed to be slidable relative to the first housing; a flexible display in which a display area of the display is contracted or extended on the basis of slide-in or slide-out driving of the second housing; a motor configured to generate driving power for sliding the second housing; a driving circuit configured to operate the motor; and at least one processor (e.g., the processor 120 or the processor 799) operably connected, directly or indirectly, to the driving circuit and the flexible display. The at least one processor may configure a part or the entirety of the activation area as an app window area in which the application execution screen is displayed. The at least one processor may recognize the occurrence of a slide-in trigger for contracting the activation area while an application execution screen is displayed in the app window area in a slide-out state. The at least one processor may identify that there occurs a consistency problem on the application execution screen when a layout of the application execution screen is changed to a first layout to fit a size of the activation area contracted in response to the slide-in trigger. The at least one processor may change the layout of the application execution screen to a second layout having no consistency problem. The at least one processor may decrease a size application execution screen changed to the second layout to fit a size of the contracted activation area and display the application execution screen in the contracted activation area.

The at least one processor may determine that there is a consistency problem on the application execution screen on the basis of sizes and positions of the UI elements on the application execution screen.

Each "processor" herein includes processing circuitry, and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A portable electronic device comprising:
a first housing;
a second housing configured to be slidable relative to the first housing;
a flexible display in which a display area of the display is configured to be contracted and/or extended on the basis of slide-in and/or slide-out driving of the second housing;
a motor configured to generate driving power for sliding the second housing;
a driving circuit configured to operate the motor; and
at least one processor, comprising processing circuitry, operably connected to the driving circuit and the flexible display,
wherein the at least one processor is individually and/or collectively configured to:
configure the display area of the flexible display as an activation area in which visual information is displayed;
recognize the occurrence of a slide-in trigger for contracting the activation area while an application execution screen is displayed in the activation area in a slide-out state;
identify whether a consistency problem occurs on the application execution screen when a state is switched from the slide-out state to a slide-in state on the basis of the occurrence of the slide-in trigger; and
provide a user interface capable of extending the activation area when the consistency problem occurs.

2. The portable electronic device of claim 1, wherein the at least one processor is individually and/or collectively configured to:
control the driving circuit to contract the activation area and change a layout of the application execution screen;
recognize that there occurs a consistency problem in which UI elements overlap one another on the application execution screen with the changed layout or a part of the UI element is invisible in an app window area designated to display the application execution screen; and
control the driving circuit to extend the activation area on the basis that the occurrence of the consistency problem is recognized.

3. The portable electronic device of claim 1, wherein the at least one processor is individually and/or collectively configured to determine that there is a consistency problem on the application execution screen on the basis of sizes and positions of the UI elements.

4. The portable electronic device of claim 1, wherein the at least one processor is individually and/or collectively configured to:
acquire a first text from an application execution screen received from an application;
create a screenshot image by capturing the application execution screen displayed in the app window area;
extract a second text from the screenshot image;
compare the first text and the second text; and
determine that there is a consistency problem on the application execution screen displayed in the app window area on the basis of the comparison result.

5. The portable electronic device of claim 1, wherein the at least one processor is individually and/or collectively configured to extend the activation area on the basis that the extension of the activation area is selected through the user interface.

6. The portable electronic device of claim 5, wherein the at least one processor is individually and/or collectively configured to:
include an arrow directed toward the outside of the activation area, information indicating an aspect ratio of the activation area to be extended, or information for notifying the consistency problem in the user interface; and
display the arrow and the information in the activation area.

7. The portable electronic device of claim 1, wherein the at least one processor is individually and/or collectively configured to:
display a configuration item, which allows a user to configure whether to solve a consistency problem when the consistency problem occurs, in the activation area; and
extend the activation area on the basis that the occurrence of the consistency problem is recognized after the consistency problem is configured to be solved through the configuration item.

8. The portable electronic device of claim 1, wherein the at least one processor is individually and/or collectively configured to:
identify an aspect ratio setting value corresponding to the application execution screen in the memory in response to the occurrence of the slide-in trigger; and
contract the activation area on the basis of the aspect ratio setting value.

9. The portable electronic device of claim 1, wherein the at least one processor is individually and/or collectively configured to:
identify that there occurs a consistency problem on the application execution screen when a layout of the application execution screen is changed to a first layout to fit a size of the activation area contracted in response to the slide-in trigger;

change the layout of the application execution screen to a second layout having no consistency problem; and decrease a size application execution screen changed to the second layout to fit a size of the contracted activation area and display the application execution screen in the contracted activation area.

10. A portable electronic device comprising:

a first housing;

a second housing configured to be slidable relative to the first housing;

a flexible display in which a display area of the display is configured to be contracted and/or extended on the basis of slide-in and/or slide-out driving of the second housing;

a motor configured to generate driving power for sliding the second housing;

a driving circuit configured to control the motor; and at least one processor, comprising processing circuitry, operably connected to the driving circuit and the flexible display, wherein the at least one processor is individually and/or collectively configured to:

configure the display area of the flexible display as an activation area;

configure a part of the activation area as an app window area in which the application execution screen is displayed;

recognize the occurrence of a slide-in trigger for contracting the activation area while an application execution screen is displayed in the app window area in a slide-out state;

control the driving circuit to contract the activation area and change a layout of the application execution screen on the basis of the occurrence of the slide-in trigger;

recognize that there occurs a consistency problem in which a part of a UI element in the application execution screen with the changed layout is invisible in the app window area designated to display the application execution screen; and remove another area of the activation area and extend the app window area to a position at which another area has been positioned on the basis that the occurrence of the consistency problem is recognized, such that a part of the UI element is visible.

11. The portable electronic device of claim 10, wherein the at least one processor is individually and/or collectively configured to:

display a first selection item, which allows a user to select removal of another area, in another area on the basis that the occurrence of the consistency problem is recognized; and remove another area and extend the app window area to a position at which another area has been positioned on the basis that the removal of another area is selected through the first selection item.

12. The portable electronic device of claim 11, wherein the at least one processor is individually and/or collectively configured to:

display a second selection item, which allows the user to select displaying of another area, at a position at which another area has been positioned after another area is removed; and display another area on the basis that the displaying of another area is selected through the second selection item.

13. A portable electronic device comprising:

a first housing;

a second housing disposed to be slidable relative to the first housing;

a flexible display in which a display area of the display is configured to be contracted and/or extended on the basis of slide-in and/or slide-out driving of the second housing;

a motor configured to generate driving power for sliding the second housing;

a driving circuit configured to operate the motor; and at least one processor, comprising processing circuitry, operably connected to the driving circuit and the flexible display, wherein the at least one processor is individually and/or collectively configured to:

configure a part or the entirety of an activation area as an app window area in which the application execution screen is displayed;

recognize the occurrence of a slide-in trigger for contracting the activation area while an application execution screen is displayed in the app window area in a slide-out state;

control the driving circuit to contract the activation area and change a layout of the application execution screen on the basis of the occurrence of the slide-in trigger;

recognize that there occurs a consistency problem in which a part of a UI element in the application execution screen with the changed layout is invisible in the app window area designated to display the application execution screen; and remove another area, which is configured as a layer higher than the app window area and covers a part of the UI element or increase transparency of another area on the basis that the occurrence of the consistency problem is recognized.

14. The portable electronic device of claim 13, wherein the at least one processor is individually and/or collectively configured to:

display a first selection item, which allows a user to select removal of another area, in another area on the basis that the occurrence of the consistency problem is recognized; and remove another area or increase transparency of another area on the basis that the removal of another area is selected through the first selection item.

15. The portable electronic device of claim 14, wherein the at least one processor is individually and/or collectively configured to:

display a second selection item, which allows the user to select displaying of another area, at a position at which another area has been positioned after another area is removed or the transparency is increased; and display another area or decrease transparency on the basis that the displaying of another area is selected through the second selection item.

* * * * *